United States Patent
Kang et al.

(10) Patent No.: US 11,402,947 B2
(45) Date of Patent: Aug. 2, 2022

(54) ELECTRONIC DEVICE AND METHOD FOR TESTING THE SAME

(71) Applicant: Samsung Display Co., Ltd., Yongin-si (KR)

(72) Inventors: Jina Kang, Hwaseong-si (KR); Dongchun Lee, Seoul (KR); Soongyu Lee, Seoul (KR); Jinwoo Kim, Hwaseong-si (KR); Byeongkyu Jeon, Busan (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/334,607

(22) Filed: May 28, 2021

(65) Prior Publication Data
US 2022/0083193 A1    Mar. 17, 2022

(30) Foreign Application Priority Data
Sep. 15, 2020 (KR) .................. 10-2020-0118025

(51) Int. Cl.
*G06F 3/041* (2006.01)
*G09G 3/20* (2006.01)
(Continued)

(52) U.S. Cl.
CPC ...... *G06F 3/04184* (2019.05); *G06F 3/03545* (2013.01); *G06F 3/04182* (2019.05);
(Continued)

(58) Field of Classification Search
CPC ............. G06F 3/03545; G06F 3/04162; G06F 3/04184; G06F 3/04182; G09G 3/006;
(Continued)

(56) References Cited

U.S. PATENT DOCUMENTS 8,797,301 B2 *  8/2014  Ryshtun ............... G06F 3/0443
                                                      345/179
9,619,051 B2 *  4/2017  Ryshtun ............... G06F 3/0441
(Continued)

FOREIGN PATENT DOCUMENTS

| KR | 10-2018-0046338 | 5/2018 |
| KR | 10-2018-0068383 | 6/2018 |
| KR | 10-2019-0070178 | 6/2019 |

*Primary Examiner* — Michael J Jansen, II
(74) *Attorney, Agent, or Firm* — Lewis Roca Rothgerber Christie LLP

(57) ABSTRACT

An electronic device includes: an input sensor on a display panel; and a sensor controller configured to operate in a first mode for sensing a first input by an input device or a second mode for sensing a second input through the input sensor, the sensor controller being configured to transmit an uplink signal to the input device through the input sensor and to receive a downlink signal from the input device through the input sensor in the first mode, wherein an input sensing frame comprises an uplink period in which the uplink signal is provided to the input sensor, and an interval between a start time point of the display frame and a start time point of the uplink period is variable in a unit of at least one input sensing frame during k input sensing frames, where k is an integer equal to or greater than 2.

20 Claims, 16 Drawing Sheets

(51) Int. Cl.
  *G09G 3/00* (2006.01)
  *G06F 3/0354* (2013.01)
(52) U.S. Cl.
  CPC .............. *G09G 3/006* (2013.01); *G09G 3/20* (2013.01); *G06F 3/04162* (2019.05); *G09G 2310/0267* (2013.01); *G09G 2310/0275* (2013.01); *G09G 2310/08* (2013.01)
(58) Field of Classification Search
  CPC ............ G09G 3/20; G09G 2310/0267; G09G 2310/0275; G09G 2310/08
  See application file for complete search history.

(56) References Cited

U.S. PATENT DOCUMENTS

| | | | | |
|---|---|---|---|---|
| 10,025,417 B2* | 7/2018 | Shin | ............... | G06F 3/0488 |
| 10,055,032 B2* | 8/2018 | Ayzenberg | ............ | G06F 3/0442 |
| 10,061,407 B2* | 8/2018 | Hara | ............. | G06F 3/044 |
| 10,359,885 B2* | 7/2019 | Brahma | ............. | G02F 1/13338 |
| 10,444,882 B2* | 10/2019 | Jung | ............. | H03M 1/12 |
| 10,474,286 B2* | 11/2019 | Bae | ............. | G06F 3/0412 |
| 10,691,228 B2* | 6/2020 | Bae | ............. | G06F 3/0442 |
| 10,845,899 B2* | 11/2020 | Hisano | ............. | G06F 3/04162 |
| 11,237,651 B2* | 2/2022 | Hisano | ............. | G06F 3/038 |
| 2006/0220077 A1* | 10/2006 | Hayashi | ............. | G06F 3/042 |
| | | | | 257/291 |
| 2013/0207938 A1* | 8/2013 | Ryshtun | ............. | G06F 3/0441 |
| | | | | 178/19.03 |
| 2016/0274720 A1* | 9/2016 | Shin | ............. | G06F 3/0412 |
| 2017/0285773 A1* | 10/2017 | Ayzenberg | ............ | G06F 3/0442 |
| 2018/0059868 A1* | 3/2018 | Brahma | ............. | G09G 3/2022 |
| 2018/0113559 A1* | 4/2018 | Bae | ............. | G06F 3/0412 |
| 2018/0120962 A1* | 5/2018 | Hara | ............. | G06F 3/0412 |
| 2018/0150168 A1* | 5/2018 | Jung | ............. | G06F 3/04166 |
| 2018/0164909 A1* | 6/2018 | Bae | ............. | G06F 3/0443 |
| 2020/0042106 A1* | 2/2020 | Hisano | ............. | G06F 3/03545 |
| 2021/0072842 A1* | 3/2021 | Hisano | ............. | G06F 3/0442 |
| 2021/0089188 A1* | 3/2021 | Lin | ............. | G06F 3/04166 |
| 2021/0297174 A1* | 9/2021 | Vincent | ............. | G06F 1/14 |
| 2021/0345361 A1* | 11/2021 | Hisano | ............. | G06F 3/04162 |

* cited by examiner

ELECTRONIC DEVICE AND METHOD FOR TESTING THE SAME

CROSS-REFERENCE TO RELATED APPLICATION

The present application claims priority to and the benefit of Korean Patent Application No. 10-2020-0118025, filed on Sep. 15, 2020, the entire content of which is hereby incorporated by reference.

BACKGROUND

1. Field

Aspects of some embodiments of the present disclosure relate to an electronic device and a testing method therefor.

2. Description of the Related Art

A multi-media electronic device such as a television, a mobile phone, a tablet computer, a navigator, a game player, or the like may generally include a display device for displaying a video. The electronic device may be provided with an input sensor capable of providing a touch-based input type to enable users to relatively easily input information or provide commands relatively intuitively and conveniently, in addition to other input mechanisms such as a button, a keyboard, or a mouse.

The input sensor may sense a touch or pressure using the body of the user. On the other hand, a request for an electronic pen for an elaborate touch input increases for a user accustomed to information input using a writing implement or a specific application program (e.g., an application program for sketch or drawing).

Accordingly, an input sensor employed in an electronic device may be desired to sense not only an input by a touch or pressure of the user body, but also various inputs such as an input by an electronic pen.

The above information disclosed in this Background section is only for enhancement of understanding of the background and therefore the information discussed in this Background section does not necessarily constitute prior art.

SUMMARY

Aspects of some embodiments of the present disclosure relate to an electronic device and a testing method therefor, and for example, to an electronic device of which the display quality is improved and a testing method for the same.

Aspects of some embodiments of the present disclosure include an electronic device and a testing method therefor which may prevent or reduce degradation in display quality when an input is sensed.

Aspects of some embodiments of the inventive concept include an electronic device including a display panel configured to display an image during a display frame; an input sensor on the display panel; and a sensor controller configured to operate in a first mode for sensing a first input by an input device or a second mode for sensing a second input different from the first input through the input sensor. The sensor controller transmits an uplink signal to an input device through the input sensor and receives a downlink signal from the input device through the input sensor to sense the first input by the input device in the first mode.

According to some embodiments, an input sensing frame in which the sensor controller operates in the first or second mode includes an uplink period in which the uplink signal is provided to the input sensor. An interval between a start time point of the display frame and a start time point of the uplink period is variable in a unit of at least one input sensing frame during k input sensing frames, where k is an integer equal to or greater than 2.

According to some embodiments of the inventive concept, a testing method for an electronic device includes displaying a test image for testing through a display panel during a plurality of display frames, transmitting an uplink signal to an input sensor on the display panel, sensing whether a noise is generated in the test image, and changing an interval between a start time point of an uplink period and a start time point of each display frame during k input sensing frames in a unit of at least one input sensing frame, where k is an integer equal to or greater than 2.

BRIEF DESCRIPTION OF THE DRAWINGS

The accompanying drawings are included to provide a further understanding of the inventive concept, and are incorporated in and constitute a part of this specification. The drawings illustrate aspects of some embodiments of the inventive concept and, together with the description, serve to explain principles of the inventive concept. In the drawings.

DETAILED DESCRIPTION

Figure 1:
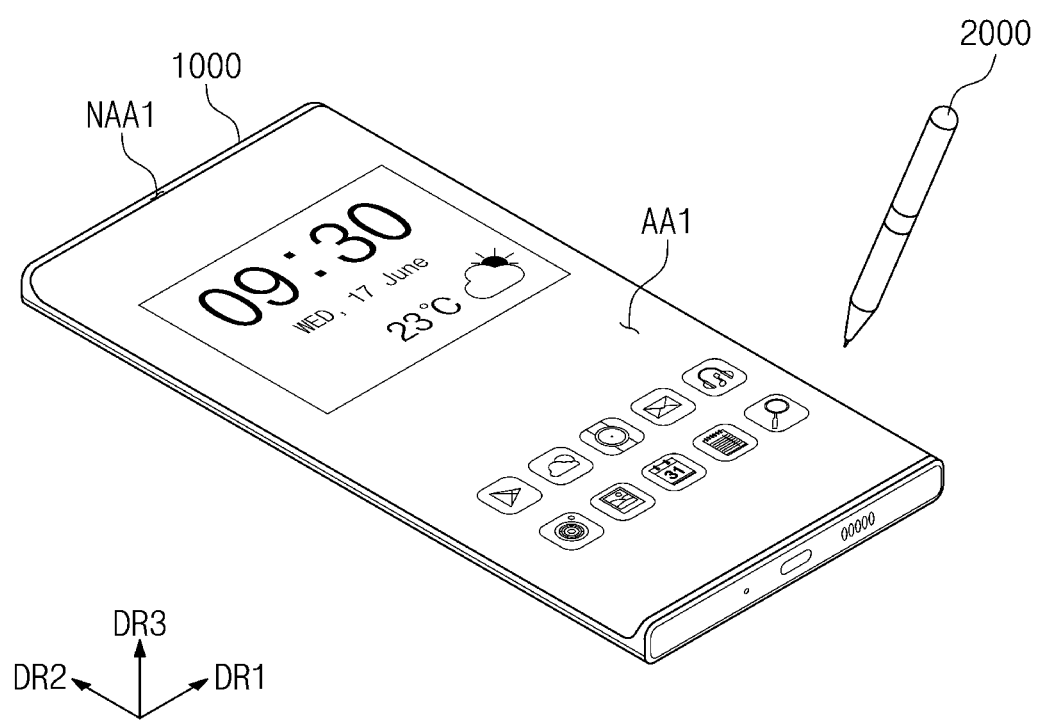
FIGS. 1 and 2 are perspective views illustrating an electronic device and an input device according to some embodiments of the inventive concept.

It will be understood that when an element or layer is referred to as being "on", "to" or "coupled to" another element or layer, it can be directly on, connected or coupled to the other element or intervening third elements may be present.

Like reference numerals in the drawings refer to like elements. In addition, in the drawings, the thickness and the ratio and the dimension of the element are exaggerated for effective description of the technical contents.

The term "and/or" includes any and all combinations of one or more of the associated items.

Terms such as first, second, and the like may be used to describe various components, but these components should not be limited by the terms. These terms are only used to distinguish one element from another. For instance, a first component may be referred to as a second component, or similarly, a second component may be referred to as a first component, without departing from the scope of the present disclosure. As used herein, the singular forms "a," "an," and "the" may be intended to include the plural forms as well, unless the context clearly indicates otherwise.

In addition, the terms such as "under", "lower", "on", and "upper" are used for explaining associations of items illustrated in the drawings. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

Hereinafter, aspects of some embodiments of the inventive concept will be described in more detail with reference to the accompanying drawings.

FIG. 1 is a perspective view illustrating an electronic device and an input device according to some embodiments of the inventive concept.

Referring to FIG. 1, the electronic device 1000 may be a device activated according to an electrical signal. For example, the electronic device 1000 may be a mobile phone, a tablet PC, a vehicle navigator, a game device, or a wearable device, but embodiments according to the present disclosure are not particularly limited thereto. In FIG. 1, the electronic device 1000 is illustrated for example as a mobile phone.

An active area AA1 and a non-active area NAA1 may be defined in the electronic device 1000. The electronic device 1000 may display an image through the active area AA1. The active area AA1 may include a surface defined by a first direction DR1 and a second direction DR2. The non-active area NAA1 may surround the periphery of the active area AA1.

The thickness direction of the electronic device 1000 may be parallel to a third direction DR3 that intersects with the first direction DR1 and the second direction DR2. Accordingly, the front surfaces (or top surfaces) and the rear surfaces (or bottom surfaces) of members composing the electronic device 1000 may be defined on the basis of the third direction DR3.

The electronic device 1000 illustrated in FIG. 1 may sense an input by a touch of a user and an input by an input device 2000. The input device 2000 may mean a device other than the body of the user. The input by the input device 2000 may be referred to as a first input. For example, the input device 2000 may be an active pen, a stylus pen, a touch pen, or an electronic pen. The input by the touch of the user may be referred to as a second input. The second input includes various types of external inputs including a part of the user body, light, heat, or pressure or the like.

The electronic device 1000 and the input device 2000 may be bi-directionally communicable. The electronic device 1000 may provide an uplink signal to the input device 2000. For example, the uplink signal may include a synchronization signal or information about the electronic device 1000, but embodiments according to the present disclosure are not limited thereto. The input device 2000 may provide a downlink signal to the electronic device 1000. The downlink signal may include a synchronization signal or state information about the input device 2000. For example, the downlink signal may include position information, battery information, or inclination information about the input device 2000, and/or various information stored in the input device 2000, but is not particularly limited thereto. The uplink signal and the down link signal will be described in more detail later.

Figure 2:
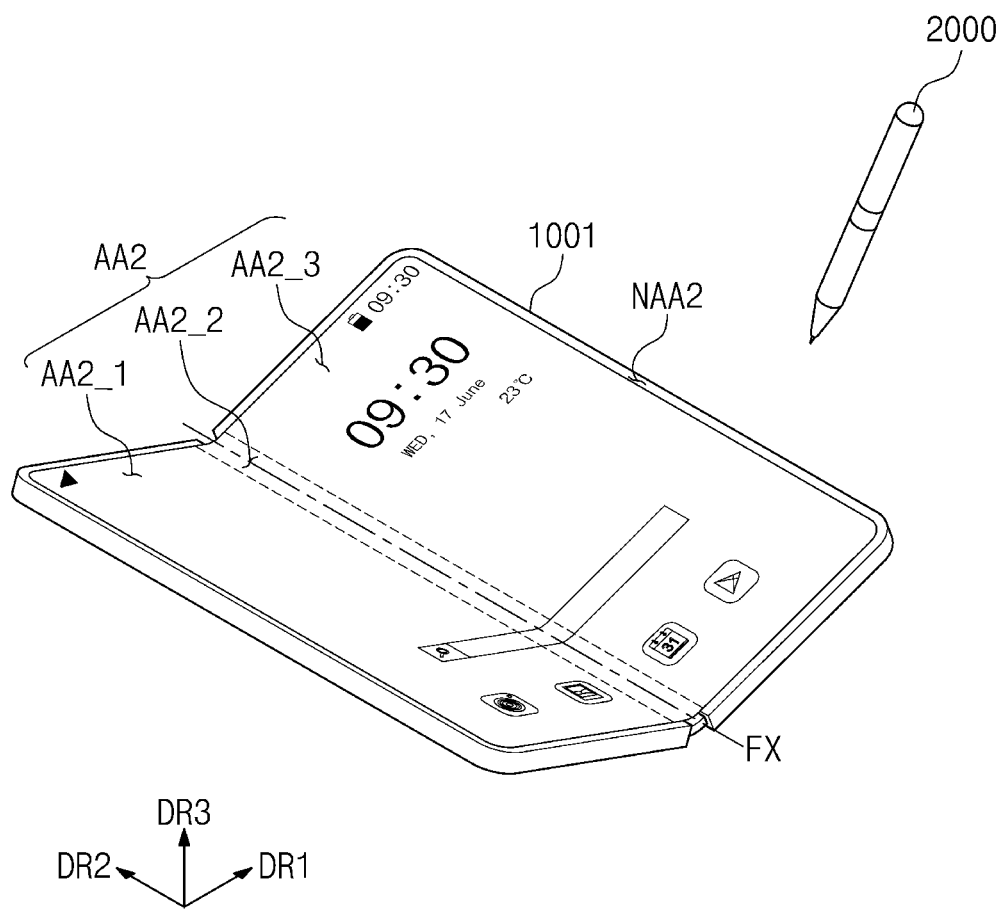

FIG. 2 is a perspective view illustrating an electronic device and an input device according to some embodiments of the inventive concept. In the description of FIG. 2, like reference numerals are given to the elements described in relation to FIG. 1, and some repetitive descriptions thereof may be omitted.

Referring to FIG. 2, the electronic device 1001 may display an image through an active area AA2. FIG. 2 illustrates that the electronic device 1001 is a foldable display device that is folded at a prescribed angle. When the electronic device 1001 is in an unfolded state (e.g., a flat or open state, in which the active area AA2 is planar), the active area AA2 may include a plane defined by or parallel to a plane defined by the first direction DR1 and the second direction DR2.

The active area AA2 may include a first area AA2_1, a second area AA2_2, and a third area AA2_3. The first, second and third areas AA2_1, AA2_2, and AA2_3 may be sequentially defined in the first direction DR1. The second area AA2_2 may be bended along a folding axis FX extending along the second direction DR2. Accordingly, the first area AA2_1 and the third area AA2_3 may be referred to as non-folding areas, and the second area AA2_2 between the first area AA2_1 and the third area AA2_3 may be referred to as a folding area.

When the electronic device 1001 is folded, the first area AA2_1 and the third area AA2_3 may face each other. Accordingly, in a completely folded state, the active area AA2 may not be exposed to the outside, and this may be called as in-folding. However, this is merely an example, and the operation of the electronic device 1001 is not limited thereto.

For example, according to some embodiments of the inventive concept, the electronic device 1001 may be folded so that the first area AA2_1 and the third area AA2_3 may oppose to each other. In this case, the active area AA2 may be exposed to the outside, and this may be called as out-folding.

For the electronic device 1001, only one operation between the in-folding operation and the out-folding operation is possible. Alternatively, the electronic device 1001 may operate so that both the in-folding and out-folding operations are possible. In this case, the second area AA2_2 of the electronic device 1001 may be in-folded or out-folded.

In FIG. 2, one folding area and two non-folding areas are illustrated, but the numbers of the folding areas and the non-folding areas are not limited thereto. For example, the electronic device 1001 may include two or more non-folding areas and a plurality of folding areas located between adjacent non-folding areas, or any other suitable number of folding areas and non-folding areas according to the design of the electronic device 1000.

FIG. 2 illustrates the folding axis FX extending in the second direction DR2, but the embodiments of the inventive concept are not limited thereto. For example, the folding axis FX may extend along an axis parallel to the first direction DR1. In this case, the first area AA2_1, the second area AA2_2 and the third areas AA2_3 may be sequentially located in the second direction DR2.

The active area AA2 may overlap at least one electronic module. For example, the electronic modules may include a camera module, a proximity/ambient light sensor, and the like. The electronic module may receive an external input delivered through the active area AA2, or provide an output through the active area AA2. A portion of the active area AA2 overlapping the camera module, the proximity/ambient light sensor, and the like may have higher transmissivity than another portion of the active area AA2. Accordingly, there may not be an area in which a plurality of electronic modules are to be located in the non-active area NAA2 around the active area AA2. As a result, an area ratio of the active area AA2 over the entire surface of the electronic device 1001 may be relatively increased, and the real estate or surface area of consumed by the non-active area NAA2 may be relatively smaller.

The electronic device 1001 and the input device 2000 may be bi-directionally communicable. The electronic device 1001 may provide an uplink signal to the input device 2000. The input device 2000 may provide a downlink signal to the electronic device 1001. The electronic device 1001 may sense the position of the input device 2000 using a signal provided from the input device 2000.

Figure 3:
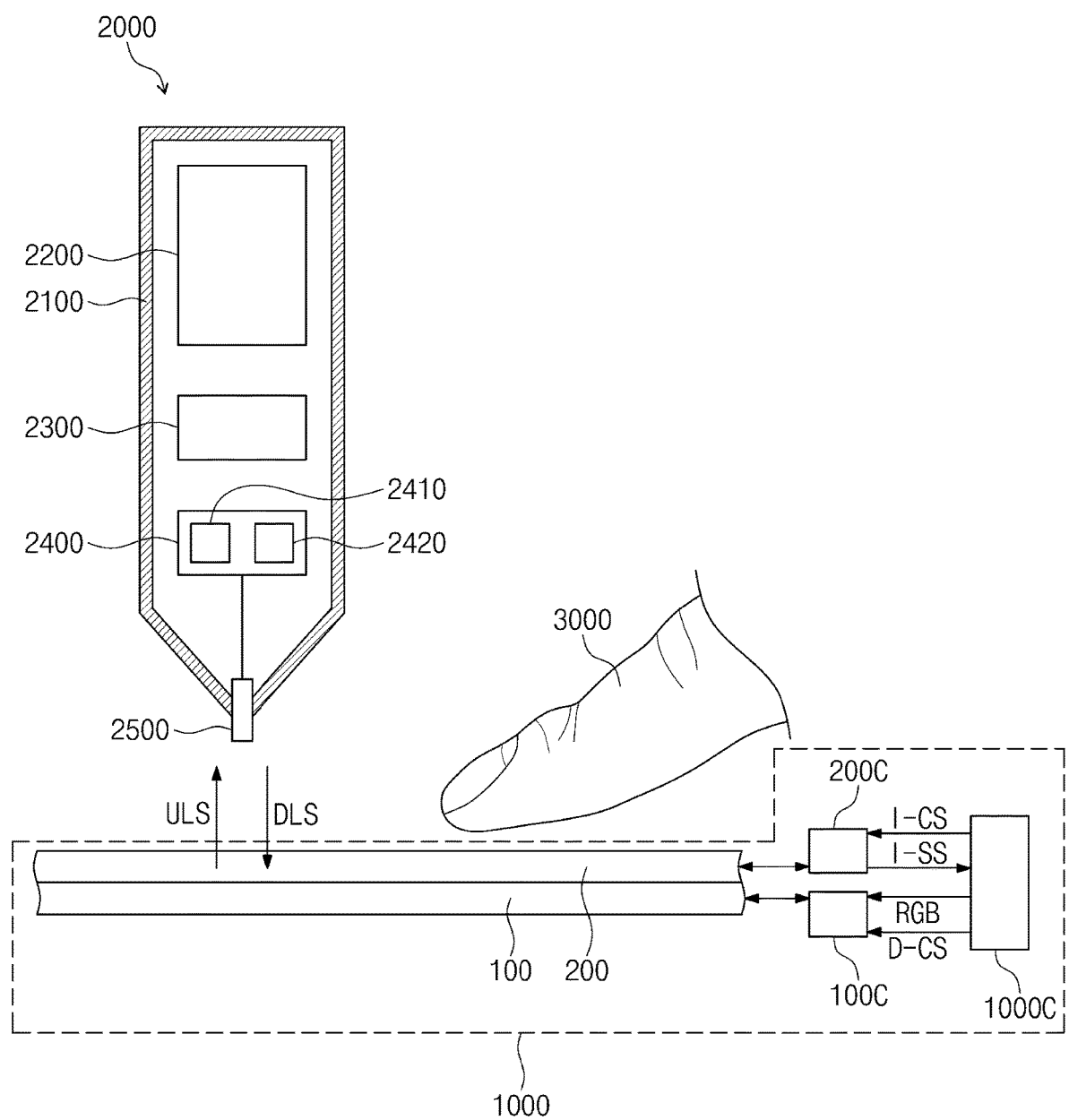
FIG. 3 is a schematic block diagram of an electronic device and an input device according to some embodiments of the inventive concept.

FIG. 3 is a schematic block diagram of an electronic device and an input device according to some embodiments of the inventive concept.

Referring to FIG. 3, the electronic device 1000 may include a display panel 100, an input sensor 200, a panel driver 100C, a sensor controller 200C, and a main controller 1000C.

The display panel 100 may be a component for substantially generating the image. The display panel 100 may be a light emitting display panel, for example, an organic light emitting display panel, a quantum dot display panel, a micro-LED display panel, or a nano-LED display panel.

The input sensor 200 may be located on the display panel 100. The input sensor 200 may sense an input applied from the outside. The input sensor 200 may sense the first input by the input device 2000 and the second input by the body 3000 of the user.

The main controller 1000C may control the general operations of the electronic device 1000. For example, the main controller 1000C may control the operations of the panel driver 100C and the sensor controller 200C. The main controller 1000C may include at least one microprocessor, and may also be referred to as a host.

The panel driver 100C may control a drive of the display panel 100. The main controller 1000C may further include a graphic controller. The panel driver 100C may receive image data RGB and a control signal D-CS from the main controller 1000C. The control signal D-CS may include various signals. For example, the control signal D-CS may include a vertical synchronization signal, a horizontal synchronization signal, a main clock signal, a data enable signal, and the like. The panel driver 100C may generate a vertical start signal and a horizontal start signal for controlling a timing at which a signal is provided to the display panel 100 on the basis of the control signal D-CS.

The sensor controller 200C may control an operation of the input sensor 200. The sensor controller 200C may receive a sensing control signal I-CS from the main controller 1000C. The sensing control signal I-CS may include a mode determination signal, a clock signal, and the like for determining a driving mode of the sensor controller 200C. The sensor controller 200C may operate in a first mode for sensing the first input by the input device 2000 or a second mode for sensing the second input by the body 3000 of the user on the basis of the sensing control signal I-CS. The sensor controller 200C may control the operation of the input sensor 200 on the basis of a mode determination signal so that the input sensor 200 operates in the first mode or the second mode to be described later.

The sensor controller 200C may calculate coordinate information about the first input or the second input on the basis of a signal received from the input sensor 200, and provide a coordinate signal I-SS having the coordinate information to the main controller 1000C. The main controller 1000C may execute an operation corresponding to the user input on the basis of the coordinate signal I-SS. For example, the main controller 1000C may operate the panel driver 100C on the basis of the coordinate signal I-SS so that a new image is displayed on the display panel 100.

The input device 2000 may include a housing 2100, a power supply 2200, a pen controller 2300, a communication module 2400, and a pen electrode 2500. However, components composing the input device 2000 are not limited to the above listed elements. For example, the input device 2000 may further include an electrode switch for switching to a signal transmission mode or a signal reception mode, a pressure sensor for sensing pressure, a memory for storing prescribed information, a rotation sensor for sensing rotation, or the like.

The housing 2100 may have a pen shape (e.g., a tube or cylinder with a pointed tip at the pen electrode 2400), and have an accommodation space therein. In the accommodation space defined in the housing 2100, the power supply 2200, the pen controller 2300, the communication module 2400, and the pen electrode 2500 may be accommodated.

The power supply 2200 may provide power to the pen controller 2300, the communication module 2400, and the like in the input device 2000. The power supply 2200 may include a battery or a high density capacitor or other power source.

The pen controller 2300 may control the operation of the input device 2000. The pen controller 2300 may be an application-specific integrated circuit (ASIC). The pen controller 2300 may be configured to operate according to a designed program.

The communication module 2400 may include a transmission circuit 2410 and a reception circuit 2420. The transmission circuit 2410 may output the downlink signal DLS to the input sensor 200. The reception circuit 2420 may receive the uplink signal provided from the input sensor 200.

The transmission circuit 2410 may receive a signal from the pen controller 2300 to modulate the received signal to a signal sensible by the input sensor 200, and the reception circuit 2420 may modulate a signal provided from the input sensor 200 to a signal processable by the pen controller 2300.

The pen electrode 2500 may be electrically connected to the communication module 2400. A portion of the pen electrode 2500 may protrude from the housing 2100. Alternatively, the input device 2000 may further include a cover housing for covering the pen electrode 2500 exposed from the housing 2100. Alternatively, the pen electrode 2500 may be embedded inside the housing 2100.

Figure 4A:
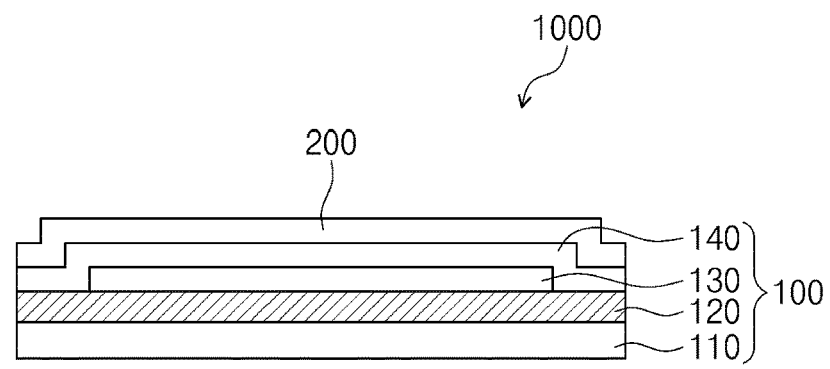
FIGS. 4A and 4B are cross-sectional views of an electronic device to according to some embodiments of the inventive concept.
Figure 4A:
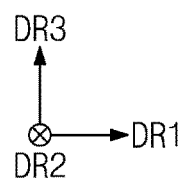

FIG. 4A is a cross-sectional view of an electronic device according to some embodiments of the inventive concept.

Referring to FIG. 4A, the electronic device 1000 may include the display panel 100 and the input sensor 200. The display panel 100 may include a base layer 110, a circuit layer 120, a light emitting element layer 130, and an encapsulation layer 140.

The base layer 110 may be a member for providing a base surface on which the circuit layer 120 is located. The base layer 110 may be a glass substrate, a metal substrate, or a polymer substrate. However, the embodiments according to the present disclosure are not limited thereto, and the base layer 110 may be an inorganic layer, an organic layer, or a composite material layer.

The base layer 110 may have a multi-layer structure. For example, the base layer 110 may include a first composite resin layer, a silicon oxide (SiOx) layer located on the composite resin layer, an amorphous silicon (a-Si) layer located on the silicon oxide layer, and a second composite resin layer located on the amorphous silicon layer. The silicon oxide layer and the amorphous layer may be referred to as a base barrier layer.

Each of the first and second composite resin layers may include polyimide-based resin. In addition, each of the first and second composite resin layers may include at least one among an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin and a perylene-based resin.

The circuit layer 120 may be located on the base layer 110. The circuit layer 120 may include an insulation layer, a semiconductor pattern, a conductive pattern, a signal line, and the like. The insulation layer, the semiconductor layer, and the conductive layer are formed on the base layer 110 in a manner of coating, deposition, or the like, and then, the insulation layer, the semiconductor layer, and the conductive layer may be selectively patterned through a plurality of photolithography processes. Then, the semiconductor pattern, the conductive pattern, and the signal line included in the circuit layer may be formed.

The light emitting element layer 130 may be located on the circuit layer 120. The light emitting element layer 130 may include a light emitting element. For example, the light emitting element layer 130 may include an organic light emitting matter, a quantum dot, a quantum rod, a micro-LED, or a nano-LED.

The encapsulation layer 140 may be located on the light emitting element layer 130. The encapsulation layer 140 may protect the light emitting element layer 130 from a foreign matter such as moisture, oxygen and dust particles.

The input sensor 200 may be formed on the display panel 100 through consecutive processes. In this case, the input sensor 200 may be expressed to be directly located on the display panel 100. To be directly located or arranged may mean that a third element is not located between the input sensor 200 and the display panel 100. In other words, a separate adhesive member may not be located between the input sensor 200 and the display panel 100. Selectively, the input sensor 200 may be coupled to the display panel 100 through an adhesive member. The adhesive member may include a typical adhesive or a pressure sensitive adhesive.

Figure 4B:
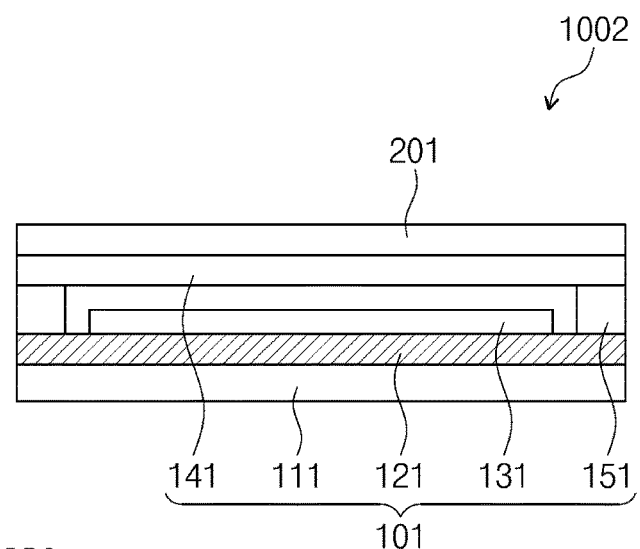
Figure 4B:
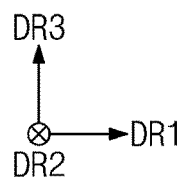

FIG. 4B is a cross-sectional view of an electronic device according to some embodiments of the inventive concept.

Referring to FIG. 4B, an electronic device 1002 may include a display panel 101 and an input sensor 201. The display panel 101 may include a base substrate 111, a circuit layer 121, a light emitting element layer 131, an encapsulation substrate 141, and a coupling member 151.

Each of the base substrate 111 and the encapsulation substrate 141 may be a glass substrate, a metal substrate, a polymer substrate, or the like, but is not limited thereto.

The coupling member 151 may be located between the base substrate 111 and the encapsulation substrate 141. The coupling member 151 may couple the encapsulation substrate 141 to the base substrate 111 or the circuit layer 121. The coupling member 151 may include an inorganic material or an organic material. For example, the inorganic material may include a frit seal, and the organic material may include a photocurable resin or a photoplastic resin. However, a material forming the coupling member 151 is not limited to the above examples.

The input sensor 201 may be directly located on the encapsulation substrate 141. To be directly located or arranged may mean that a third element is not located between the input sensor 201 and the encapsulation substrate 141. In other words, a separate adhesive member may not be located between the input sensor 201 and the display panel 101. However, the embodiments of the inventive concept are not limited thereto, and the adhesive member may be further located between the input sensor 201 and the encapsulation substrate 141.

Figure 5:
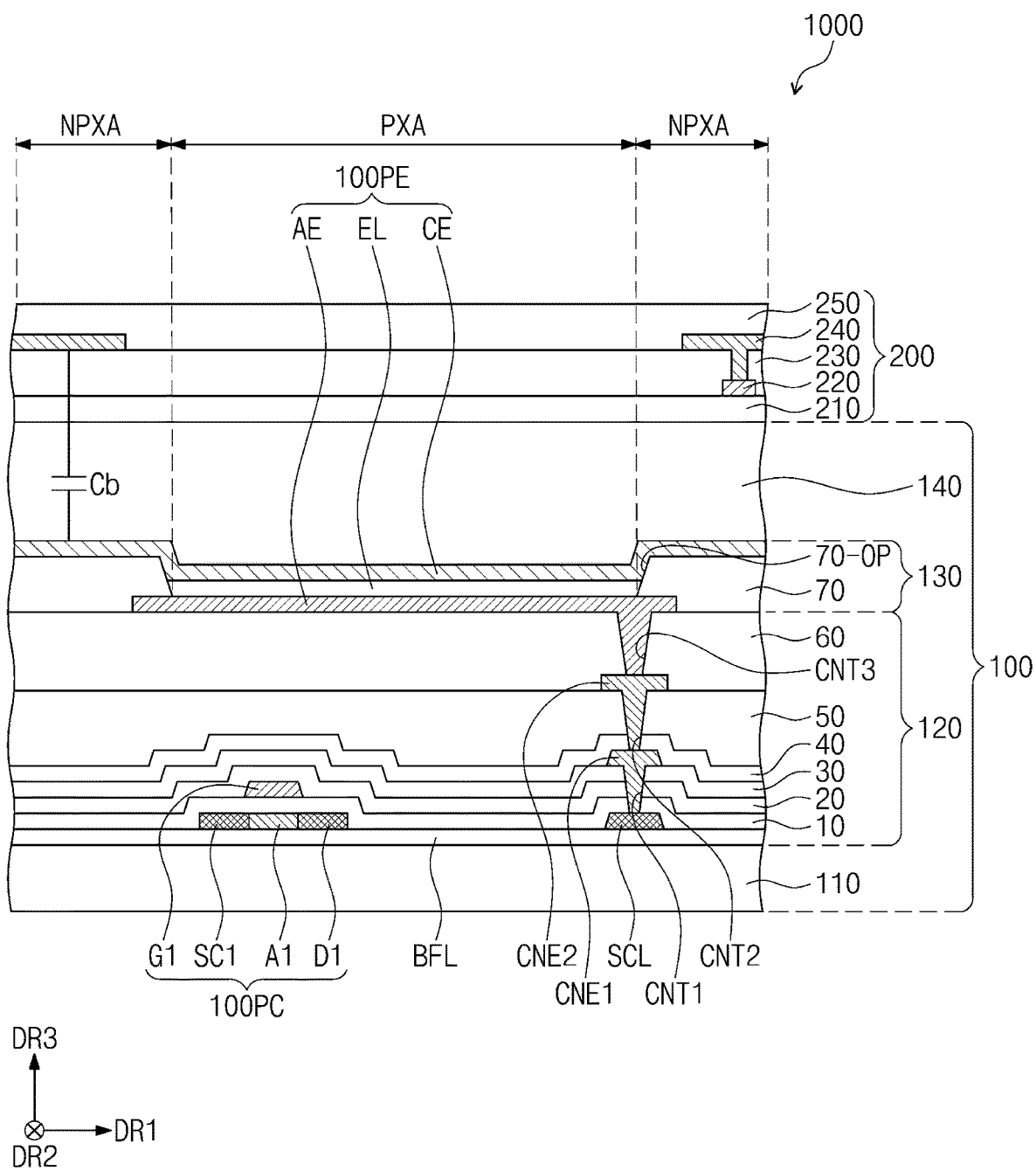
FIG. 5 is a cross-sectional view of an electronic device according to some embodiments of the inventive concept.

FIG. 5 is a cross-sectional view of an electronic device according to some embodiments of the inventive concept. In description about FIG. 5, like reference numerals are given to the elements described in relation to FIG. 4A, and descriptions thereabout will be omitted.

Referring to FIG. 5, one inorganic layer may be formed on the top surface of the base layer 110. The inorganic layer may include at least one among aluminum oxides, titanium oxide, silicon oxide, silicon oxynitride, zirconium oxide, and hafnium oxide. The inorganic layer may be formed with multilayer. The multilayer inorganic layer may compose a barrier layer and/or a buffer layer. According to some embodiments, the display panel 100 is illustrated to include the buffer layer BFL.

The buffer layer BFL may enhance the bonding force between the base layer 110 and the semiconductor pattern. The buffer layer BFL may include a silicon oxide layer and a silicon nitride layer, and the silicon oxide layer and the silicon nitride layer may be alternately laminated.

The semiconductor pattern may be located on the buffer layer BFL. The semiconductor pattern may include polysilicon. However, the embodiments of the inventive concept are not limited thereto, and the semiconductor pattern may also include amorphous silicon, low-temperature polycrystalline silicon, or oxide semiconductor.

FIG. 5 just illustrates a portion of the semiconductor pattern, and another semiconductor pattern may be further located in another area. The semiconductor pattern may be arrayed in a specific rule across pixels. The semiconductor pattern has different electrical properties according to whether to be doped or not. The semiconductor pattern may include a first area having high conductivity and a second area having low conductivity. The first area may be doped with an N-type dopant or a P-type dopant. A P-type transistor includes a doping area doped with a P-type dopant, and an N-type transistor includes a doping area doped with an N-type dopant. The second area may be a non-doping area, or be doped at a low concentration relative to the first area.

The first area may have greater conductivity than the second area, and substantially operate as an electrode or a signal line. The second area may substantially correspond to an active area (or a channel) of the transistor. In other words, a portion of the semiconductor pattern may be an active area of the transistor, another portion may be a source or a drain, and another part may be a connection electrode or a signal connection line.

Each pixel may have an equivalent circuit including seven transistors, one capacitor, and a light emitting element, and the equivalent circuit of the pixel may be changed in various ways. According to some embodiments, the circuit may include additional electrical components or fewer electrical components without departing from the spirit and scope of embodiments according to the present disclosure. In FIG. 5, one transistor 100PC and a light emitting element 100PE in the pixel are illustrated as an example, but embodiments according to the present disclosure are not limited thereto.

The transistor 100PC may include a source SC1, an active A1, a drain D1, and a gate G1. The source SC1, the active A1, and the drain D1 may be formed from the semiconductor pattern. The source SC1 and the drain D1 may extend from the active A1 on a cross section in opposite directions from each other. FIG. 5 illustrates a portion of a signal connection line SCL formed from the semiconductor pattern. According to some embodiments, the signal connection line SCL may be electrically connected to the drain D1 of the transistor 100PC on a plane.

A first insulation layer 10 may be located on the buffer layer BFL. The first insulation layer 10 may commonly overlap the plurality of pixels and cover the semiconductor pattern. The first insulation layer 10 may be an inorganic layer and/or organic layer, and have a single layer or multilayer structure. The first insulation layer 10 may include at least one among aluminum oxides, titanium oxide, silicon oxide, silicon oxynitride, zirconium oxide, and hafnium oxide. According to some embodiments, the first insulation layer 10 may be a silicon oxide layer of a single layer. Not only the first insulation layer 10, but the insulation layer of the circuit layer 120, which will be described layer, may also be an inorganic layer and/or organic layer, and have a single layer or multilayer structure. The inorganic layer may include at least one among the aforementioned materials, but is not limited thereto.

The gate G1 may be located on the first insulation layer 10. The gate G1 may be a portion of a metal pattern. The gate G1 may overlap the active A1. The gate G1 may function as a mask in a process of doping the semiconductor pattern.

A second insulation layer 20 may be located on the first insulation layer 10 and cover the gate G1. The second insulation layer 20 may commonly overlap the pixels. The second insulation layer 20 may be an inorganic layer and/or organic layer, and have a single layer or multilayer structure. The second insulation layer 20 may include at least one among aluminum oxide, titanium oxide, silicon oxide, and silicon oxynitride. According to some embodiments, the second insulation layer 20 may have a multilayer structure including a silicon oxide layer and a silicon nitride layer.

A third insulation layer 30 may be located on the second insulation layer 20. The third insulation layer 30 may have a single layer or multilayer structure. For example, the third insulation layer 30 may have a multilayer structure including a silicon oxide layer and a silicon nitride layer.

A first connection electrode CNE1 may be located on the third insulation layer 30. The first connection electrode CNE1 may be connected to the signal connection line SCL through a first contact hole CNT1 penetrating through the first to third insulation layers 10, 20, and 30.

A fourth insulation layer 40 may be located on the third insulation layer 30. The fourth insulation layer 40 may be a silicon oxide layer of a single layer. A fifth insulation layer 50 may be located on the fourth insulation layer 40. The fifth insulation layer 50 may be an organic layer.

A second connection electrode CNE2 may be located on the fifth insulation layer 50. The second connection electrode CNE2 may be connected to the first connection electrode CNE1 through a second contact hole CNT2 penetrating through the fourth insulation layer 40 and the fifth insulation layer 50.

A sixth insulation layer 60 may be located on the fifth insulation layer 50 and cover the second connection electrode CNE2. The sixth insulation layer 60 may be an organic layer.

The light emitting element layer 130 may be located on the circuit layer 120. The light emitting element layer 130 may include the light emitting element 100PE. For example, the light emitting element layer 130 may include an organic light emitting material, a quantum dot, a quantum rod, a micro-LED, or a nano-LED. Hereinbelow, the light emitting element 100PE is described for the purpose of illustration as an organic light emitting element, but embodiments according to the present disclosure are not limited thereto.

The light emitting element 100PE may include a first electrode AE, a light emitting layer EL, and a second electrode E2. The first electrode AE may be located on the sixth insulation layer 60. The first electrode AE is connected to the second connection electrode CNE2 through a third contact hole CNT3 penetrating through the sixth insulation layer 60.

A pixel definition layer 70 may be located on the sixth insulation layer 60 and cover a portion of the first electrode AE. The pixel definition layer 70 is defined with an opening portion 70-OP. The opening portion 70-OP of the pixel definition layer 70 exposes at least a portion of the first electrode AE.

The active area AA1 (see, e.g., FIG. 1) may include an emission area PXA and a non-emission area NPXA adjacent to the emission area PXA. The non-emission area NPXA may surround the emission area PXA. According to some embodiments, the emission area PXA is defined in correspondence to a partial area of the first electrode AE exposed by the opening portion 70-OP.

The light emitting layer EL may be located on the first electrode AE. The light emitting layer EL may be located on an area corresponding to the opening portion 70-OP. In other words, a plurality of light emitting layers EL may be separately formed in each of the plurality of pixels. When the light emitting layers EL are separately formed in the respective pixels, each light emitting layer EL may emit light of one color among blue, red, and green. However, the embodiments of the inventive concept are not limited thereto, and the light emitting layer EL may be connected to the pixels and commonly provided. In this case, the light emitting layer EL may provide blue light, or white light.

The second electrode CE may be located on the light emitting layer EL. The second electrode CE may have an integrated shape, and be commonly arranged in the plurality of pixels.

According to some embodiments, a hole control layer may be located between the first electrode AE and the light emitting layer EL. The hole control layer may be commonly arranged on the emission area PXA and the non-emission area NPXA. The hole control layer may include a hole transport layer, and further include a hole injection layer. An electron control layer may be located between the light emitting layer EL and the second electrode CE. The electron control layer may include an electron transport layer, and further include an electron injection layer. The hole control layer and the electron control layer may be commonly formed in the plurality of pixels using an open mask.

The encapsulation layer 140 may be located on the light emitting element layer 130. The encapsulation layer 140 may include an inorganic layer, an organic layer, and an inorganic layer that are sequentially laminated, but the layers forming the encapsulation layer 140 are not limited thereto.

The inorganic layers may protect the light emitting element layer 130 from moisture and oxygen, and the organic layer may protect the light emitting element layer 130 from a foreign matter such as a dust particle. The inorganic layers may include a silicon nitride layer, a silicon oxynitride layer, a silicon oxide layer, a titanium oxide layer, an aluminum oxide layer, or the like. The organic layer may include an acrylate-based organic layer, but is not limited thereto.

The input sensor 200 may be formed on the display panel 100 through consecutive processes. In this case, the input sensor 200 may be expressed to be directly located on the display panel 100. Alternately, the input sensor 200 may be coupled to the display panel 100 through an adhesive member. The adhesive member may include a typical adhesive or a pressure sensitive adhesive.

The input sensor 200 may include a base insulation layer 210, a first conductive layer 220, a sensing insulation layer 230, a second conductive layer 240, and a cover insulation layer 250.

The base insulation layer 210 may be an inorganic layer including any one among silicon nitride, silicon oxynitride, and silicon oxide. Alternatively, the base insulation layer 210 may be an organic layer including an epoxy resin, an acrylic resin, or an imide-based resin. The base insulation layer 210 may have a single layer structure, or a multilayer structure laminated along the third direction DR3.

Each of the first conductive layer 220 and the second conductive layer 240 may have a single layer structure or a multilayer structure laminated along the third direction DR3.

The conductive layer of the single layer structure may include a metal layer or a transparent conductive layer. The metal layer may include molybdenum, silver, titanium, copper, aluminum, and an alloy thereof. The transparent conductive layer may include a transparent conductive oxide such as indium tin oxide (ITO), indium zinc oxide (IZO), zinc oxide (ZnO), indium zinc tin oxide (IZTO), or the like. Besides, the transparent conductive layer may include a conductive polymer such as PEDOT, a metal nano-wire, or graphene.

The conductive layer of the multilayer structure may include metal layers. For example, the metal layers may have a three-layer structure of titanium/aluminum/titanium.

The conductive layer of the multilayer structure may include at least one metal layer and at least one transparent conductive layer.

At least one of the sensing insulation layer 230 or the cover insulation layer 250 may include an inorganic film. The inorganic film may include at least one among aluminum oxide, titanium oxide, silicon oxide, silicon nitride, silicon oxynitride, zirconium oxide, and hafnium oxide.

At least one of the sensing insulation layer 230 or the cover insulation layer 250 may include an organic film. The organic film may include at least one among an acrylate-based resin, a methacrylate-based resin, polyisoprene, a vinyl-based resin, an epoxy-based resin, a urethane-based resin, a cellulose-based resin, a siloxane-based resin, a polyimide based-resin, a polyamide-resin, and a parylene-based resin.

A parasitic capacitance Cb may be generated between the input sensor 200 and the display panel 100. As the distance between the input sensor 200 and the display panel 100 becomes shorter, the value of the parasitic capacitance Cb may increase. The greater the parasitic capacitance Cb, the more a flicker may be viewed in an image displayed on the display panel 100 when the input is sensed. In particular, when the uplink signal ULS (see FIG. 3) is transmitted to the input device 2000 (see FIG. 3) through the input sensor 200, the flicker may be viewed in an area in which a timing of application of the uplink signal ULS matches a timing of application of a scan signal to the display panel 100.

Figure 6:
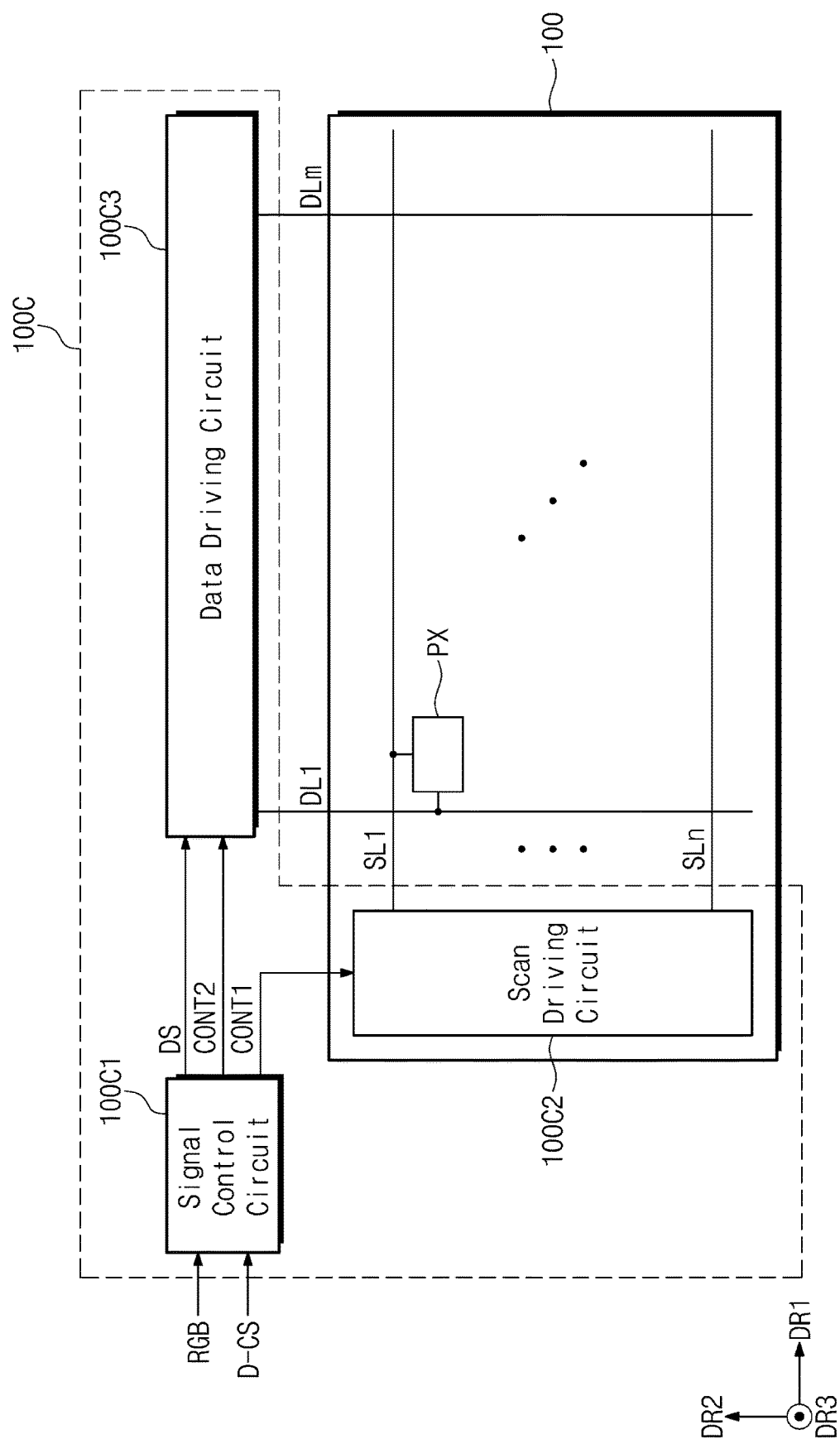
FIG. 6 is a block diagram of a display panel and a panel driver according to some embodiments of the inventive concept.

FIG. 6 is a block diagram of a display panel and a panel driver according to some embodiments of the inventive concept.

Referring to FIG. 6, the display panel 100 may include a plurality of scan lines SL1 to SLn, a plurality of data lines DL1 to DLm, and a plurality of pixels PX. The plurality of pixels PX may be respectively connected to corresponding data lines among the plurality of data lines DL1 to DLm, and to corresponding scan lines among the plurality of scan lines SL1 to SLm. According to some embodiments of the inventive concept, the display panel 100 may further include light emission control lines, but the configuration of the display panel 100 is not particularly limited.

The panel driver 100C may include a signal control circuit 100C1, a scan driving circuit 100C2, and a data driving circuit 100C3. The panel driver 100C may further include a light emission driving circuit for providing control signals to the light emission control lines.

The signal control circuit 100C1 may receive the image data RGB and the panel control signal D-CS from the main controller 1000C (see FIG. 3). The panel control signal D-CS may include various signals. For example, the panel control signal D-CS may include a vertical synchronization signal, a horizontal synchronization signal, a main clock, a data enable signal, and the like.

The signal control circuit 100C1 may generate a scan control signal CONT1 on the basis of the panel control signal D-CS, and output the scan control signal CONT1 to the scan driving circuit 100C2. The scan control signal CONT1 may include a vertical start signal, a clock signal, and the like.

The signal control circuit 100C1 may generate a data control signal CONT2 on the basis of the panel control signal D-CS, and output the data control signal CONT2 to the data driving circuit 100C3. The data control signal CONT2 may include a horizontal start signal, an output enable signal, and the like.

In addition, the signal control circuit 100C1 may output a data signal DS obtained by processing the image data RGB in correspondence to an operation condition of the display panel 100 to the data driving circuit 100C3. The scan control signal CONT1 and the data control signal CONT2 are signals respectively required for operations of the scan driving circuit 100C2 and the data driving circuit 100C3, and are not particularly limited.

The scan driving circuit 100C2 may drive the plurality of scan lines SL1 to SLn in response to the scan control signal CONT1. The scan driving circuit 100C2 may sequentially apply scan signals the plurality of scan lines SL1 to SLn. According to some embodiments of the inventive concept, the scan driving circuit 100C2 may be formed in the same process as the circuit layer 120 (see FIG. 5) in the display panel 100, but is not limited thereto. For example, the scan driving circuit 100C2 may be implemented in an integrated circuit to be directly mounted in a prescribed area, or be mounted on a separate printed circuit board in a chip on film (COF) manner and electrically connected to the display panel 100.

The data driving circuit 100C3 may output grayscale voltages for driving the plurality of data lines DL1 to DLm in response to the data control signal CONT2 and the data signal DS from the signal control circuit 100C1. The data driving circuit 100C3 may be implemented in an integrated circuit to be directly mounted in a prescribed area of the display panel 100, or be mounted on a separate printed circuit board in a chip on film (COF) manner and electrically connected to the display panel 100, but is not particularly limited. For example, the data driving circuit 100C3 may be formed in the same process as the circuit layer 120 (see FIG. 5) in the display panel 100.

Figure 7A:
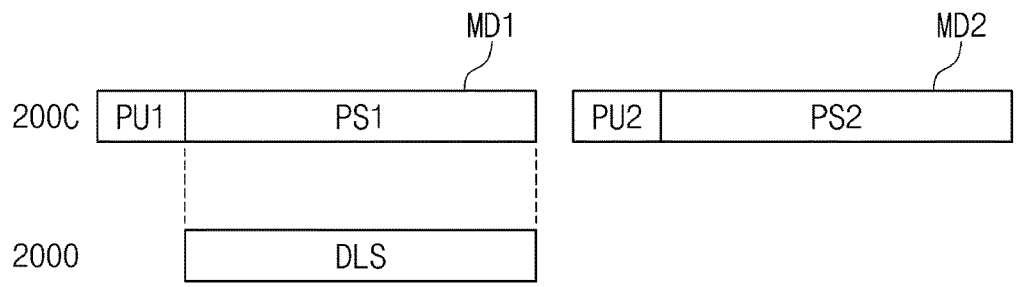
FIG. 7A is a conceptual diagram illustrating operations in a first mode and a second mode according to some embodiments of the inventive concept.

FIG. 7A is a conceptual diagram illustrating operations in a first mode and a second mode according to some embodiments of the inventive concept.

Referring to FIGS. 3 and 7A, the sensor controller 200C may operate in the first mode MD1 for sensing the first input by the input device 2000 or in the second mode MD2 for sensing the second input by the body 3000 of the user.

The first mode MD1 may include a first period PU1 and a second period PS1. The second period PS1 may follow the first period PU1. During the first period PU1, the sensor controller 200C may transmit the uplink signal ULS to the input sensor 200. The first period PU1 may be referred to as an uplink period. During the second period PS1, the sensor controller 200C may receive the downlink signal DLS provided from the input device 2000 through the input sensor 200. The second period PS1 may include a downlink period in which the downlink signal DLS is received. The sensor controller 200C may sense the first input by the input device 2000 on the basis of the downlink signal DLS.

The sensor controller 200C may operate in the second mode MD2, after the first mode MD1 ends. The first mode MD1 and the second mode MD2 may be repeated together.

The second mode MD2 may include a first period PU2 and a second period PS2. The second period PS2 may follow the first period PU2. During the first period PU2, the sensor controller 200C may transmit the uplink signal ULS to the input sensor 200. During the second period PS2, the sensor controller 200C may sense the second input by the body 3000 of the user.

The input device 2000 may provide a response signal for the uplink signal ULS to the input sensor 200. When receiving the response signal through the input sensor 200 in the first period PU1, the sensor controller 200C may operate in the second period PS1 of the first mode MD1. When not receiving the response signal through the input device 2000 in the first period PU2, the sensor controller 200C may operate in the second period PS2 of the second mode MD2. Accordingly, the sensor controller 200C may periodically monitor the presence of the input device 2000, and easily sense the first input by the input device 2000. However, this is merely an example, and the operation of the sensor controller 200C is not particularly limited.

Figure 7B:
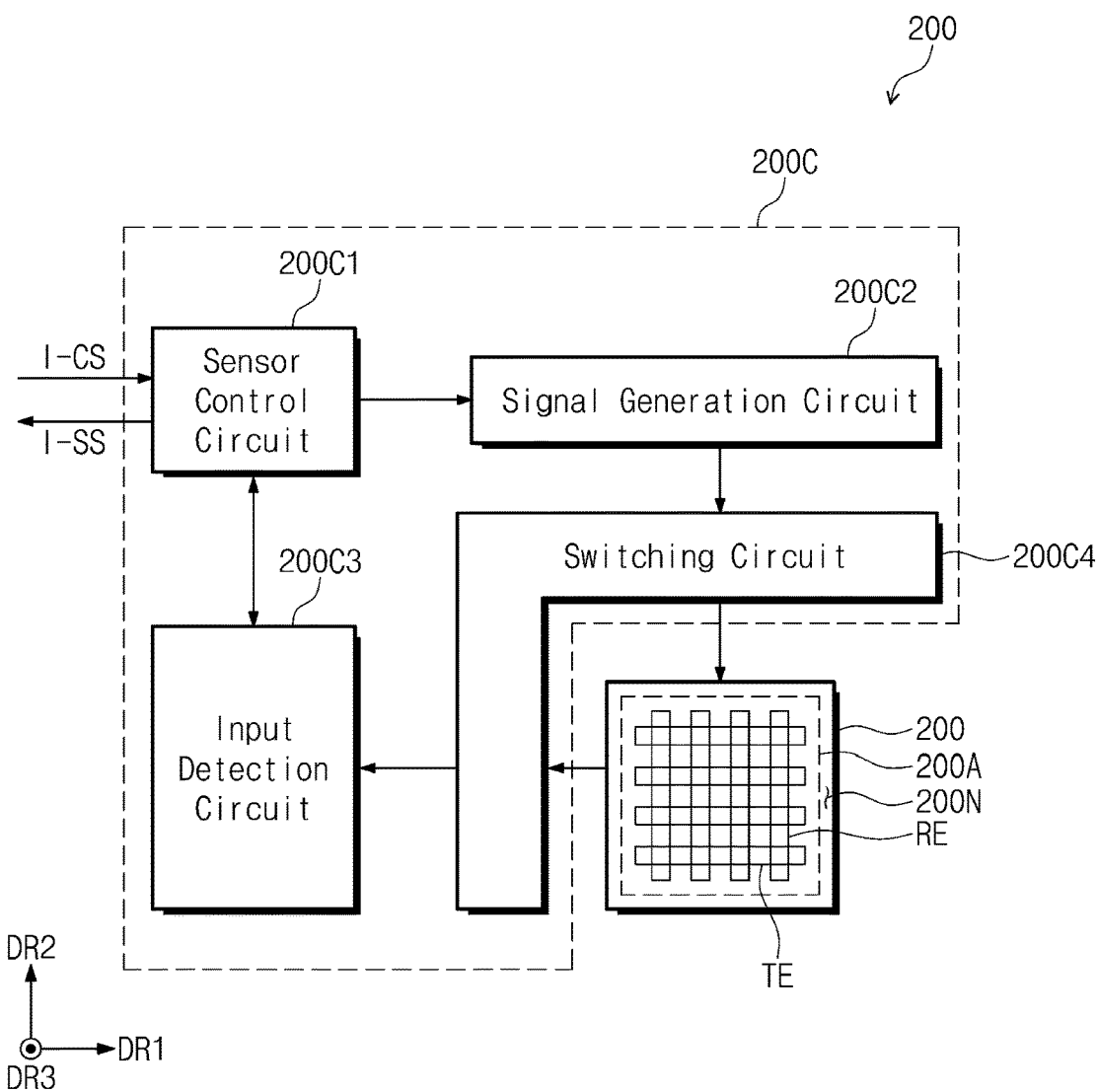
FIG. 7B is a block diagram of an input sensor and a sensor controller according to some embodiments of the inventive concept.
Figure 7C:
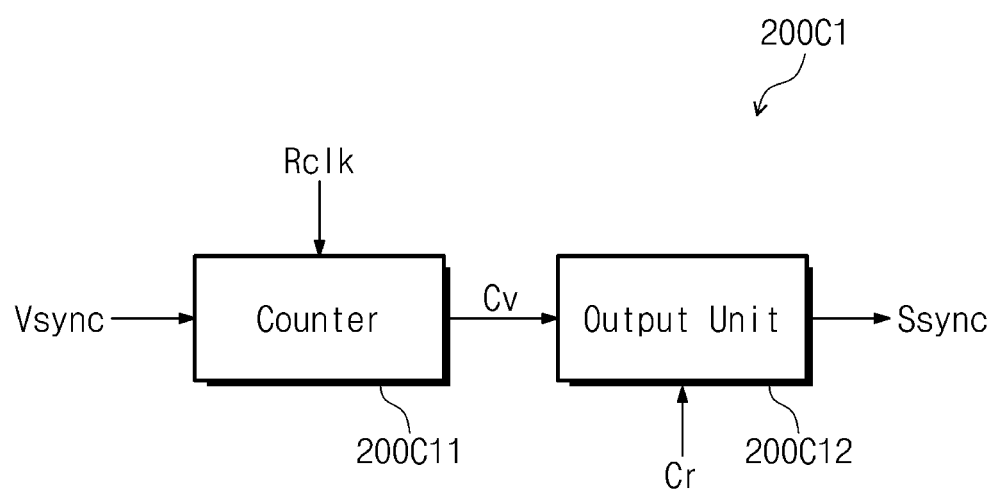
FIG. 7C is an internal block diagram of a sensor control circuit according to some embodiments of the inventive concept.

FIG. 7B is a block diagram of an input sensor and a sensor controller according to some embodiments of the inventive concept, and FIG. 7C is an internal block diagram of a sensor control circuit according to some embodiments of the inventive concept.

Referring to FIG. 7B, a sensing area 200A and a non-sensing area 200N may be defined in the input sensor 200. The sensing area 200A may be an area activated according to an electrical signal. For example, the sensing area 200A may be an area through which an input is sensed. The sensing area 200A may overlap the active area AA1 (see FIG. 1) of the electronic device 1000. The non-sensing area 200N may surround the sensing area 200A. The non-sensing area 200N may overlap the non-active area NAA1 (see FIG. 1) of the electronic device 1000.

The input sensor 200 may include a plurality of transmission electrodes TE and a plurality of reception electrodes RE. The plurality of transmission electrodes TE may extend along the first direction DR1 and be arranged to be spaced apart from each other in the second direction DR2. The plurality of reception electrodes RE may extend along the second direction DR2 and be arranged to be spaced apart from each other in the first direction DR1.

The plurality of reception electrodes RE and the plurality of transmission electrodes TE may be insulated from each other and intersect with each other. Each of the plurality of transmission electrodes TE and the plurality of reception electrodes RE may have a bar shape or a stripe shape. When each of the plurality of transmission electrodes TE and the plurality of reception electrodes RE has the bar shapes or the stripe shapes, the sensing characteristics of consecutive linear inputs provided through the input device 2000 may be improved. However, the shape of each of the plurality of transmission electrodes TE and the plurality of reception electrodes RE is not limited to the bar shape or the stripe shape.

The sensor controller 200C may receive the sensing control signal I-CS from the main controller 1000C (see FIG. 3), and provide the coordinate signal I-SS to the main controller 1000C.

The sensor controller 200C may include a sensor control circuit 200C1, a signal generation circuit 200C2, an input detection circuit 200C3, and a switching circuit 200C4. The sensor control circuit 200C1, the signal generation circuit 200C2, and the input detection circuit 200C3 may be implemented in a single chip, or some of the sensor control circuit 200C1, the signal generation circuit 200C2, and the input detection circuit 200C3, and the other may be implemented in different chips.

The sensor control circuit 200C1 may control operations of the signal generation circuit 200C2 and the switching circuit 200C4, calculate coordinates of an external input from a driving signal received from the input detection circuit 200C3, or analyze information, transmitted from the input device 2000 (see FIG. 3), from the modulated signal received from the input detection circuit 200C3.

The signal generation circuit 200C2 may provide a transmission signal or the uplink signal ULS to the input sensor 200. The signal generation circuit 200C2 may output the uplink signal ULS to the input sensor 200 in the first mode, and output the transmission signal to the input sensor 200 in the second mode.

The input detection circuit 200C3 may receive a reception signal or a downlink signal DLS from the input sensor 200. The input detection circuit 200C3 may filter the reception signal or the downlink signal DLS, or convert the signal into a signal processable in the sensor control circuit 200C1 to provide the filtered or converted signal to the sensor control circuit 200C1.

The switching circuit 200C4 may selectively control an electrical connection relationship between the input sensor 200 and the signal generation circuit 200C2 and/or the input detection circuit 200C3 according to a control of the sensor control circuit 200C1. The switching circuit 200C4 may connect one group of or each of the plurality of transmission electrodes TE and the plurality of reception electrodes RE to the signal generation circuit 200C2 according to a control of the sensor control circuit 200C1. Alternately, the switching circuit 200C4 may connect one group of or all of the plurality of transmission electrodes TE and the plurality of reception electrodes RE to the input detection circuit 200C3.

The sensor control circuit 200C1 may receive a vertical synchronization signal Vsync from the main controller 1000C (see FIG. 3), and generate a sense synchronization signal Ssync on the basis of vertical synchronization signal Vsync. The sense synchronization signal Ssync may have a different frequency from the vertical synchronization signal Vsync or have a randomly variable frequency.

The sensor control circuit 200C1 may include a counter 200C11 and an output unit 200C12. The counter 200C11 may receive the vertical synchronization signal Vsync and a preset reference clock signal Rclk. The counter 200C11 counts the reference clock signal Rclk from a start time point of the vertical synchronization signal Vsync. For example, the counter 200C11 may count 1 whenever one period of the reference clock signal Rclk elapses from the start time point of the vertical synchronization signal Vsync.

The counted value Cv of the counter 200C11 may be provided to the output unit 200C12. The output unit 200C12 compares the counted value Cv with a preset reference value Cr. The reference value Cr provided to the output unit 200C12 may vary in the unit of at least one input sensing frame. When the counted value Cv is identical to the reference value Cr, the output unit 200C12 may output the sense synchronization signal Ssync activated in synchronization with a start time point of the next period of the reference clock signal Rclk. The output sense synchronization signal Ssync is provided to the signal generation circuit 200C2, and the signal generation circuit 200C2 outputs the uplink signal ULS at an activation time point of the sense synchronization signal Ssync. The signal generation circuit 200C2 changes an output time point of the uplink signal ULS according to the sense synchronization signal Ssync.

As an example of the inventive concept, the uplink signal ULS may further include period information about the uplink signal ULS or period information about the sense synchronization signal Ssync. In other words, as a time point at which the uplink signal ULS is to be generated in a next input sensing frame is transmitted in advance to the input device 2000, when the input device 2000 does not receive the uplink signal ULS at the above-described time point, an operation mode of the input device 2000 may be switched to a sleep mode.

Figure 8:
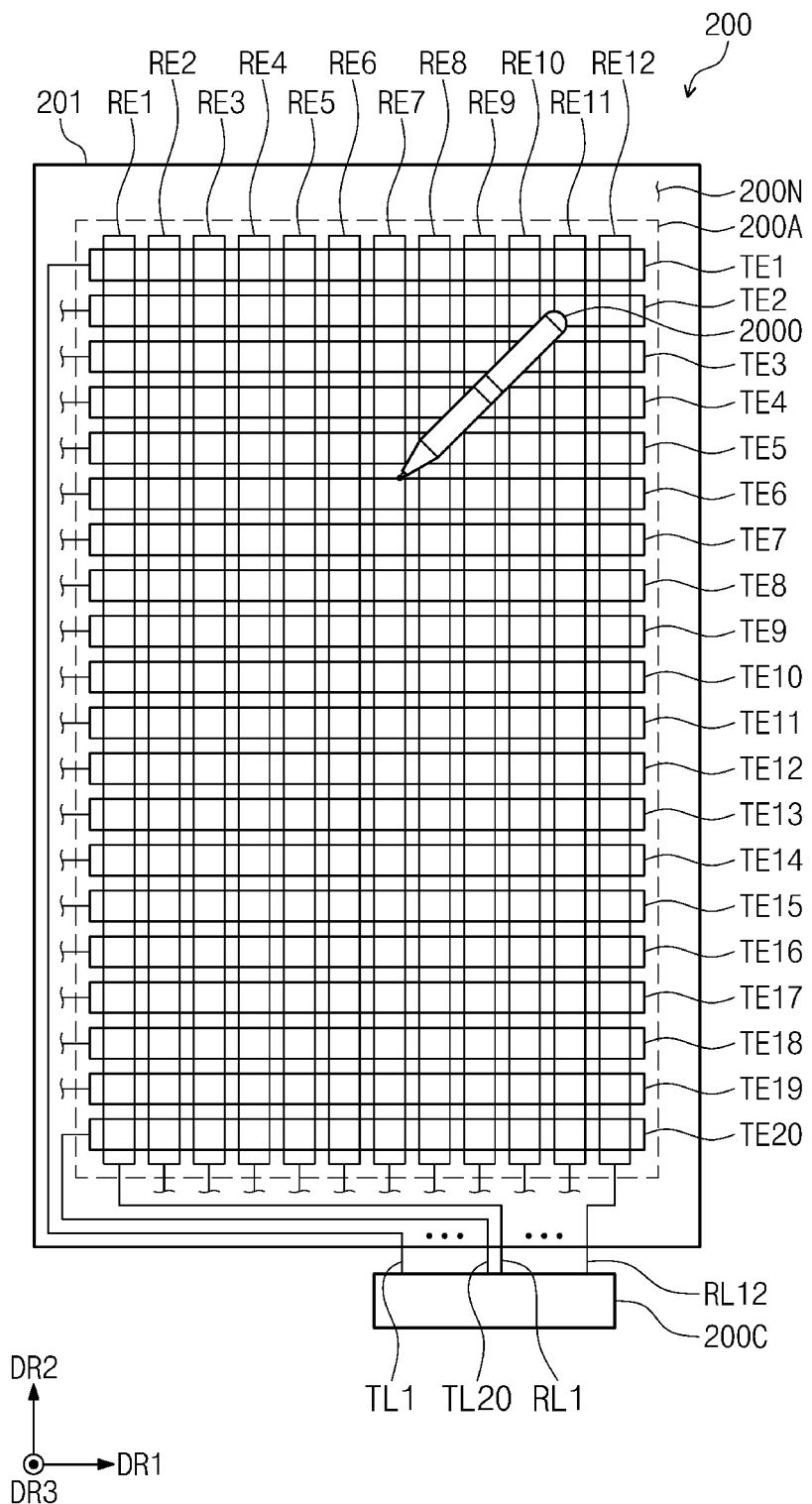
FIG. 8 is a plan view of an input sensor according to some embodiments of the inventive concept.

FIG. 8 is a plan view of an input sensor according to some embodiments of the inventive concept.

Referring to FIG. 8, the input sensor 200 may include a base insulation layer 210, a plurality of transmission electrodes TE1 to TE20, a plurality of reception electrodes RE1 to RE12, a plurality of transmission lines TL1 to TL20, and a plurality of reception lines RL1 to RL12.

The plurality of transmission electrodes TE1 to TE20 and the plurality of reception electrodes RE1 to RE12 may be located in a sensing area 200A. The plurality of transmission electrodes TE1 to TE20 extend along the first direction DR1, and are arranged to be spaced apart from each other in the second direction DR2. The plurality of transmission electrodes TE1 to TE20 may extend along the scan lines SL1 to SLn shown in FIG. 6. Each of the plurality of transmission electrodes TE1 to TE20 may have a bar shape or a stripe shape. The plurality of reception electrodes RE1 to RE12 extend along the second direction DR2, and are arranged to be spaced apart from each other in the first direction DR1. Each of the plurality of reception electrodes RE1 to RE12 may have a bar shape or a stripe shape. As an example of the inventive concept in FIG. 8, a structure in which 20 transmission electrodes TE1 to TE20 and 12 reception electrodes RE1 to RE12 are located in the sensing area 200A is illustrated, but the numbers of the transmission electrodes TE1 to TE20 and the reception electrodes RE1 to RE12 are not particularly limited. Each of the plurality of transmission electrodes TE1 to TE20 and the plurality of reception electrodes RE1 to RE12 may have a mesh shape. In addition, each shape of the plurality of transmission electrodes TE1 to TE20 and the plurality of reception electrodes RE1 to RE12 is not limited to the bar shape or the stripe shape. The plurality of transmission electrodes TE1 to TE20 and the plurality of reception electrodes RE1 to RE12 may have a structure in which diamond shape sensor units are arrayed, and in this case, each of the sensor units may have a mesh shape.

The plurality of transmission lines TL1 to TL20 and the plurality of reception lines RL1 to RL12 may be located in a non-sensing area 200N. The plurality of transmission electrodes TE1 to TE20 may electrically connected to corresponding lines among the plurality of transmission lines TL1 to TL20, respectively. The plurality of reception electrodes RE1 to RE12 may electrically connected to corresponding lines among the plurality of reception lines RL1 to RL20, respectively. In FIG. 8, illustrated is a single routing structure in which one transmission line is connected to each of the transmission electrodes TE1 to TE20 and one reception line is connected to each of the reception electrodes RE1 to RE12, but the structure is not particularly limited thereto. For example, one pair of reception lines may be respectively connected to both ends of each of the plurality of reception electrodes RE1 to RE12. Alternately, one pair of transmission lines may be respectively connected to both ends of each of the plurality of transmission electrodes TE1 to TE20, or one pair of reception lines may be connected to both ends of each of the plurality of reception electrodes RE1 to RE12.

The plurality of transmission lines TL1 to TL20 and the plurality of reception lines RL1 to RL12 may be electrically connected to the sensor controller 200C. The plurality of transmission electrodes TE1 to TE20 may be electrically connected to the sensor controller 200C through the plurality of transmission lines TL1 to TL20, and the plurality of reception electrodes RE1 to RE12 may be electrically connected to the sensor controller 200C through the plurality of reception lines RL1 to RL12.

The sensor controller 200C may provide the uplink signal ULS to the plurality of transmission electrodes TE1 to TE20. When the input device 2000 is located at a first position of the input sensor 200, the sensor controller 200C receives the downlink signal (DLS, shown in FIG. 3) from the input device 2000 to sense the first input of the input device 2000.

Figure 9A:
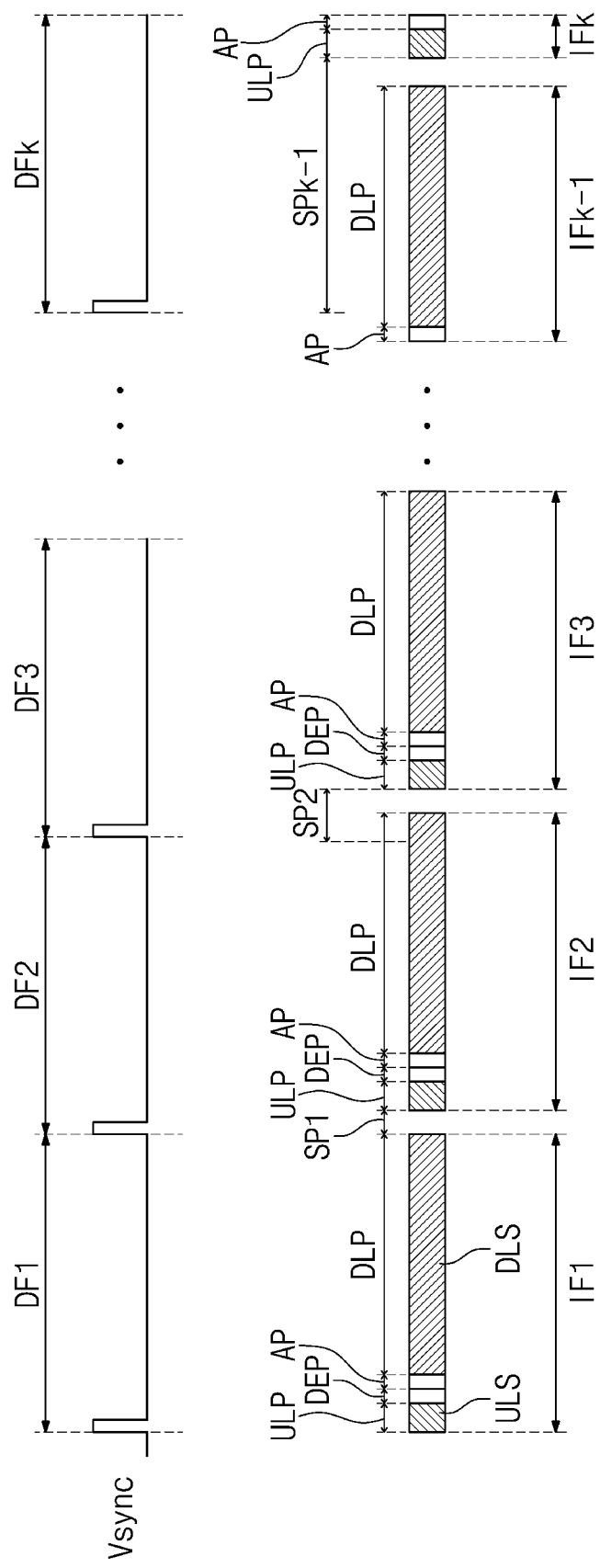
FIGS. 9A and 9B are waveform charts for explaining an operation in a first mode of a sensor controller according to some embodiments of the inventive concept.
Figure 9B:
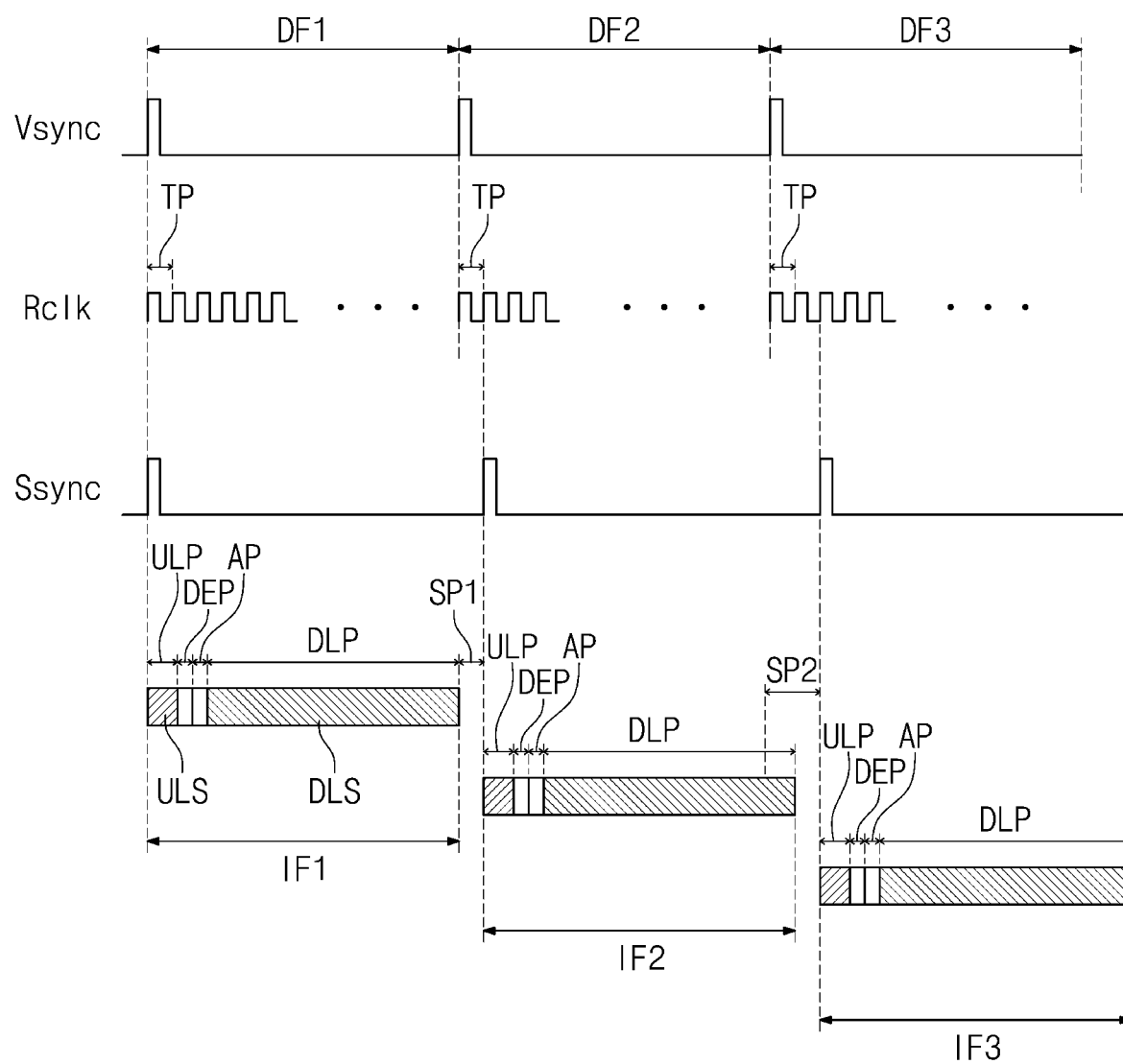

FIGS. 9A and 9B are waveform charts for explaining an operation in a first mode of a sensor controller according to some embodiments of the inventive concept.

Referring to FIGS. 3, 9A and 9B, the electronic device 1000 displays an image through the display panel 100. A time unit in which the display panel 100 displays the image may be referred to as a display frame. When an operation frequency of the display panel DP is 60 Hz, 60 display frames DF1 to DFk are included in one second, and a time corresponding to each display frame DF1 to DFk may be about 16.67 ms. When an operation frequency of the display panel 100 is 120 Hz, 120 display frames DF1 to DFk are included in one second, and a time corresponding to each display frame DF1 to DFk may be about 8.3 ms. The operation frequency of the display panel 100 may be determined by the vertical synchronization signal Vsync.

The sensor controller 200C may sense the first input during a plurality of input sensing frames IF1 to IFk in the first mode. Each of the input sensing frame IF1 to IFk may include an uplink period ULP in which the uplink signal ULS is transmitted to the input sensor 200, and a downlink period DLP in which the downlink signal DLS is received from the input device 2000. At least some (e.g., a k-th input sensing frame IFk) of the plurality of input sensing frames IF1 to IFk may not include the downlink period DLP.

At least some of the input sensing frames IF1 to IFk may further include a response period AP between the uplink period ULP and the downlink period DLP. During the response period AP, the sensor controller 200C may receive a response signal from the input device 2000 through the input sensor 200. A delay period DEP may be further located between the uplink period ULP and the response period AP.

The k-th input sensing frame IFk may include the uplink period ULP and the response period AP. Alternately, the k-th input sensing frame IFk may include the uplink period ULP, the response period AP, and the downlink period DLP. The time width of the downlink period DLP of the k-th input sensing frame IFk may be smaller than that of each of the downlink periods DLP of other input sensing frames IF1 to IF3.

Some (e.g., second and third input sensing frames IF2 and IF3 to (k−1)th input sensing frame IFk−1) among the input sensing frames IF1 to IFk may respectively overlap the next display frames DF3 to DFk. As an example of the inventive concept, each time width of the first to (k−1)-th input sensing frames IF1 to IFk−1 may be identical to each other.

Referring to FIGS. 9A and 9B, each of some IF1 to IF3 and IFk−1 among the input sensing frames IF1 to IFk may include the uplink period ULP and the downlink period DLP. Here, the downlink period DLP of each of some (IF2, IF3, and IFk−1) among the input sensing frames IF1 to IFk may overlap the next display frame. For example, the downlink period DLP of the second input sensing frame IF2 may overlap the third display frame DF3, and the downlink period DLP of the third input sensing frame IF3 may overlap a fourth display frame. In addition, the downlink period DLP of the (k−1)-th input sensing frame IFk−1 may overlap the k-th display frame DFk.

An interval (hereinafter, referred to as a shift period) between a start time point of each of the display frames DF1 to DFk and a start time point of the uplink period ULP may vary in the unit of at least one input sensing frame during k input sensing frames IF1 to IFk. Here, k may be defined as an integer equal to or greater than 2. A variable operation (hereinafter, referred to as a sequential shift operation) may be repeated in the unit of k input sensing frames IF1 to IFk. The start time point of each of the display frames DF1 to DFk is defined as a start time point of an activation period of the vertical synchronization signal Vsync, and the start time point of the uplink period ULP may be defined as a start time point of an activation period of the sensing synchronization signal Ssync.

A start time point of the first input sensing frame IF1 among the plurality of input sensing frames IF1 to IFk may be identical to a start time point of a corresponding display frame DF1. An interval between the start time point of the first display frame DF1 and the start time point of the uplink period ULP of the first input sensing frame IF1 may be '0'.

Start time points of the second to k-th input sensing frames IF2 to IFk among the plurality of input sensing frames IF1 to IFk may be different from start time points of corresponding second to k-th display frames DF2 to DFk, respectively. The start time points of the second to k-th input sensing frames IF2 to IFk may be shifted or delayed from the start time points of the corresponding second to k-th display frames DF2 to DFk, respectively.

A start time point of a j-th input sensing frame among k input sensing frames IF1 to IFk may be shifted or delayed by (j−1) times of a preset shift period (namely, a first shift period SP1) from a start time point of a corresponding j-th display frame. Here, j is an integer smaller than k.

For example, the start time point of the first input sensing frame IF1 may be identical to the start time point of the corresponding first display frame DF1. On the other hand, the start time point of the second input sensing frame IF2 may be shifted or delayed by the first shift period SP1 from the start time point of the corresponding second display frame DF2. As shown in FIG. 9B, the first shift period SP1 may have the time width corresponding to one period TP of the reference clock signal Rclk. In addition, the start time point of the third input sensing frame IF3 may be shifted or delayed by a second shift period SP2 from the start time point of the corresponding third display frame DF3. Here, the time width of the second shift period SP2 may be greater than the time width of the first shift period SP1. As an example of the inventive concept, the second shift period SP2 may have the time width corresponding to double the time width of the first shift period SP1. The start time point of the k-th input sensing frame IFk may be shifted or delayed by a (k−1)-th second shift period SPk−1 from the start time point of the corresponding k-th display frame DFk. Here, the (k−1)-th shift period SPk−1 may have the time width corresponding to (k−1) times the time width of the first shift period SP1.

According to some embodiments of the inventive concept, the sensor controller 200C may repeat the above-described shift operation in the unit of k input sensing frames IF1 to IFk. In other words, a start time point of a (k+1)-th input sensing frame may be identical to a start time point of a corresponding (k+1)-th display frame, and a start time point of a (k+2)-th input sensing frame may be shifted or delayed by the first shift period SP1 from a start time point of a corresponding (k+2)-th display frame.

In FIG. 9B, it is described for the purposes of illustration that the first shift period SP1 has the time width corresponding to the one period TP of the reference clock signal Rclk, but the time width of the first shift period SP1 is not particularly limited and may be modified in various ways. For example, the first shift period SP1 may have the time width corresponding to two or three periods.

Even when the start time points of some IF2 to IFk−1 among the input sensing frames IF1 to IFk are shifted, the downlink period DLP may be overlap the next display frame, and thus the number of input sensing frames, in which the downlink period DLP is removed or reduced, may be minimized. Accordingly, even when the uplink period ULP is shifted, a time during which the downlink signal DLS is received from the input device 2000 may be sufficiently secured.

In FIGS. 9A and 9B, a case in which the sensor controller 200C operates in the first mode is described for the purposes of illustration as the sequential shift operation, but the embodiments of the inventive concept are not limited thereto. Even when the sensor controller 200C operates in the second mode, the interval between the start time point of each of the display frames DF1 to DFk and the start time point of the uplink period ULP may vary in the unit of at least one input sensing frame during the k input sensing frames IF1 to IFk.

When the uplink signal ULS (see FIG. 3) is transmitted to the input sensor 200 (see FIG. 3), a flicker may be viewed in an area in which a timing of application of the uplink signal ULS matches a timing of application of a scan signal to the display panel 100. As the start time point of the uplink period ULP is changed in the unit of at least one input sensing frame, an area in which the flicker may be generated by the uplink signal ULS in the active area AA1 (see FIG. 1) of the electronic device 1000 (see FIG. 1) may be periodically shifted. Accordingly, instances of a flicker effect being steadily viewed at a specific position may be prevented or reduced, and as a result, the display quality of the electronic device 1000 may be improved.

Figure 10A:
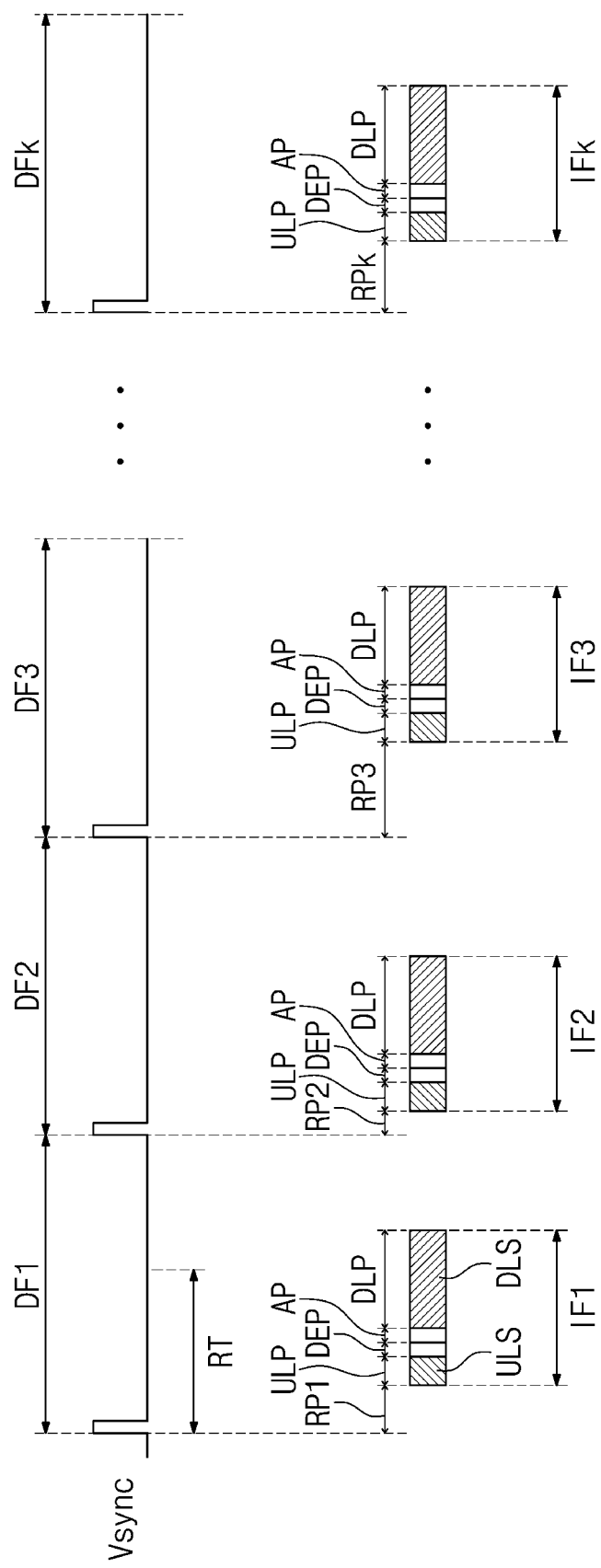
FIGS. 10A and 10B are waveform charts for explaining an operation in a first mode of a sensor controller according to some embodiments of the inventive concept.
Figure 10B:
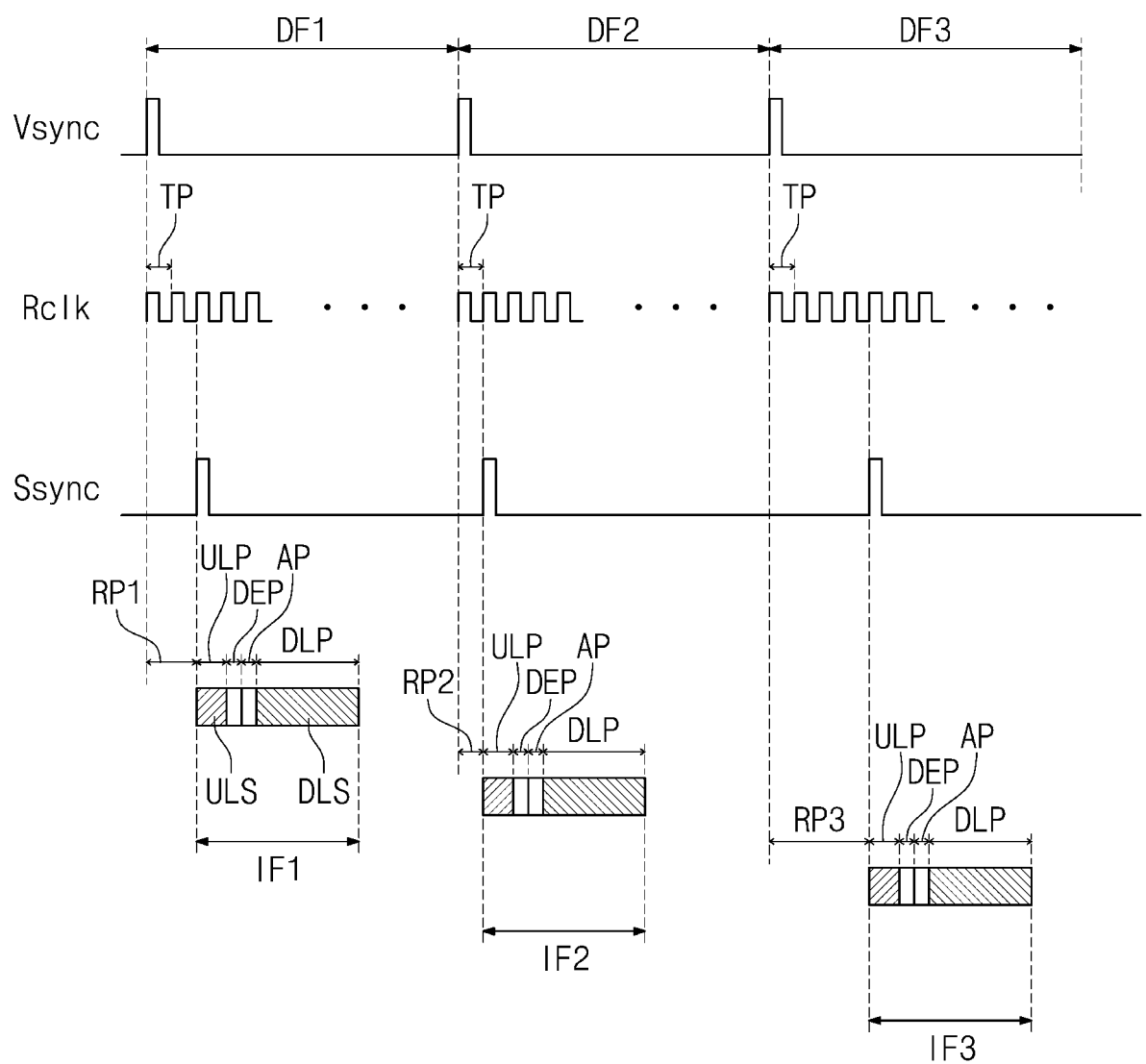

FIGS. 10A and 10B are waveform charts for explaining the operation in the first mode of the sensor controller according to some embodiments of the inventive concept.

Referring to FIGS. 10A and 10B, intervals (hereinafter, referred to as random shift periods RP1 to RPk) between the start time points of the display frames DF1 to DFk and the start time points of the uplink periods ULP may randomly vary in the unit of at least one input sensing frame during the k input sensing frames IF1 to IFk. Here, k may be defined as an integer equal to or greater than 2. A random variable operation (hereinafter, referred to as a random shift operation) may be repeated in the unit of the k input sensing frames IF1 to IFk. The start time point of each of the display frames IF1 to IFk is defined as the start time point of the activation period of the vertical synchronization signal Vsync, and the start time point of the uplink period ULP may be defined as the start time point of the activation period of the sensing synchronization signal Ssync.

During the k input sensing frames IF1 to IFk, the time width of each of k random shift periods RP1 to RPk may randomly vary in the unit of one input sensing frame.

The start time point of the first input sensing frame IF1 among the plurality of input sensing frames IF1 to IFk may be shifted or delayed by a first random shift period RP1 from the start time point of the corresponding first display frame DF1. The start time point of the second random input sensing frame IF2 may be shifted or delayed by a second random shift period RP2 from the start time point of the corresponding second display frame DF2. Here, the time width of the first random shift period RP1 may be different from that of the second random shift period RP2. The first random shift period RP1 may have the time width corresponding to double the one period TP of the reference clock signal Rclk, and the second random shift period RP2 may have the time width corresponding to the one period TP of the reference clock signal Rclk.

The start time point of the third input sensing frame IF3 may be shifted or delayed by a third random shift period RP3 from the start time point of the corresponding third display frame DF3. Here, the time width of the third random shift period RP3 may be different from those of the first and second random shift periods RP1 and RP2. The third random shift period RP3 may have the time width corresponding to quadruple the one period TP of the reference clock signal Rclk. The start time of the k-th input sensing frame IFk may be shifted or delayed by a k-th random shift period RPk from the start time of the corresponding k-th display frame DFk. The time width of the k-th random shift period RPk may be different from that of at least one among the first to third random shift periods RP1, RP2 and RP3.

As an example of the inventive concept, the sensor controller 200C may repeat the above-described random shift operation in the unit of the k input sensing frames IF1 to IFk. In other words, the start time point of the (k+1)-th input sensing frame may be shifted or delayed from the start time point of the corresponding (k+1)-th display frame, and the start time point of the (k+2)-th input sensing frame may be shifted or delayed by the second random shift period RP2 from the start time point of the corresponding (k+2)-th display frame.

The input sensing frames IF1 to IFk may not overlap the next display frames DF2 to DFk, respectively. For example, the first input sensing frame IF1 may not overlap the second display frame DF2, and the second input sensing frame IF2 may not overlap the third display frame DF3.

Each input sensing frame IF1 to IFk may include an uplink period ULP in which the uplink signal ULS is transmitted to the input sensor 200 and a downlink period DLP in which the downlink signal DLS is received from the input device 2000. At least some of the input sensing frames IF1 to IFk may further include a response period AP between the uplink period ULP and the downlink period DLP. A delay period DEP may be further located between the uplink period ULP and the response period AP.

A quiet period may be further located between the input sensing frames IF1 to IFk. During the quiet period, the sensor controller 200C and the input device 2000 may not perform data communication with each other. The quiet period may be omitted in some input sensing frames, and the time width of the quiet period may be different for each frame.

FIGS. 10A and 10B illustrate a structure in which one downlink period DLP is included in each of the input sensing frames IF1 to IFk, but each of the input sensing frames IF1 to IFk may include one or more (e.g., two or three) downlink periods DLP.

As an example of the inventive concept, the first to k-th random shift periods RP1 to RPk may have different time widths in a preset reference range RT. The reference range RT may be set as a range in which the time width of the downlink period DLP of each of the input sensing frames IF1 to IFk is sufficiently secured. In addition, in FIGS. 10A and 10B, the reference range RT is set to a period having a prescribed time width from the start time point of the activation period of the vertical synchronization signal Vsync, but the reference range RT is not particularly limited and is modified in various ways.

In FIGS. 10A and 10B, a case in which the sensor controller 200C operates in the first mode is described for the purpose of illustration as the sequential shift operation, but the embodiments of the inventive concept are not limited thereto. Even when the sensor controller 200C operates in the second mode, an interval between the start time point of each of the display frames DF1 to DFk and the start time point of the uplink period ULP may randomly vary in the unit of at least one input sensing frame during the k input sensing frames IF1 to IFk.

In this way, as the start time point of the uplink period ULP is randomly changed in the unit of at least one input sensing frame, an area in which the flicker may be generated by the uplink signal ULS in the active area AA1 (see FIG. 1) of the electronic device 1000 (see FIG. 1) may be periodically changed. Accordingly, instances of a flicker effect being steadily viewed at a specific position may be prevented or reduced, and as a result, the display quality of the electronic device 1000 may be improved.

Figure 11A:
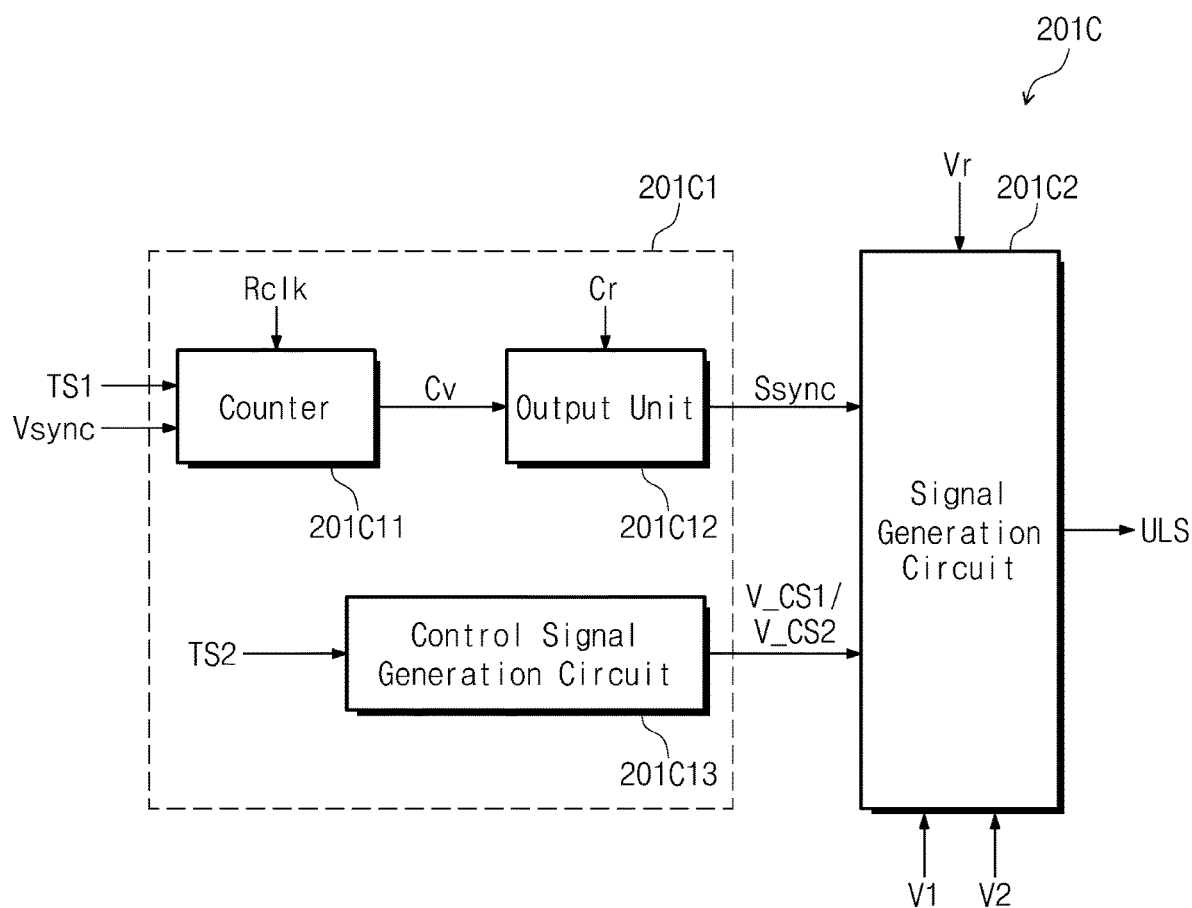
FIG. 11A is an internal block diagram of a sensor control circuit according to some embodiments of the inventive concept.
Figure 11B:
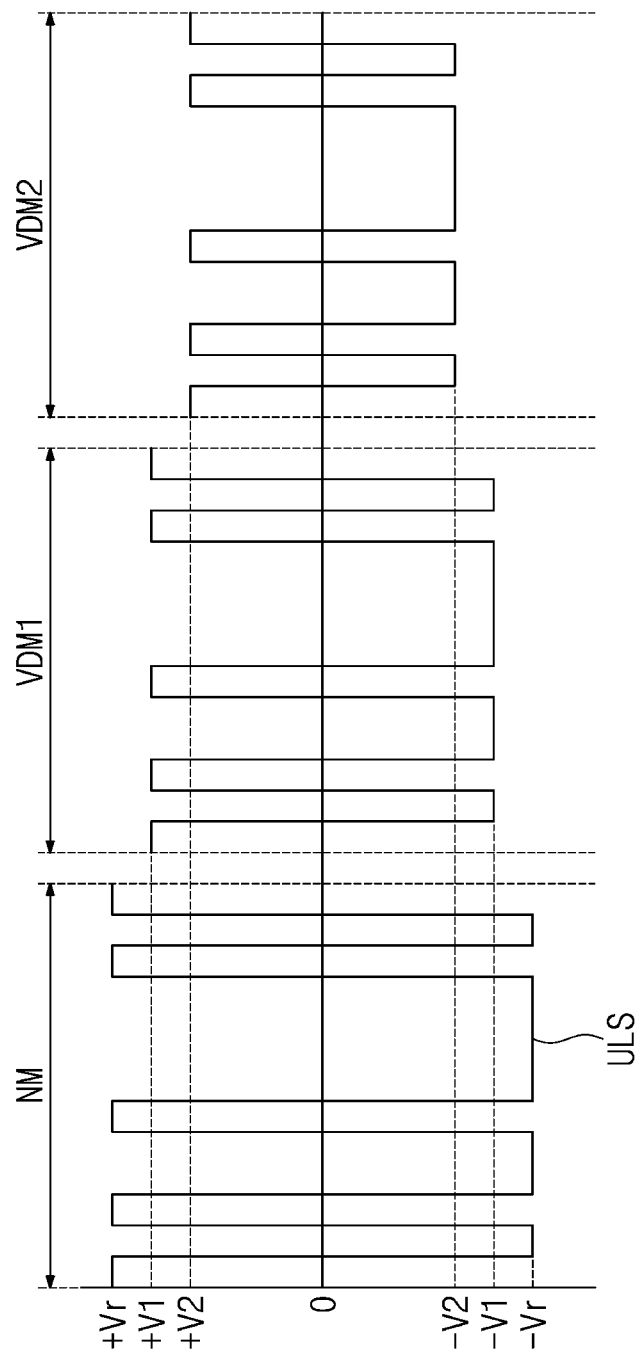
FIG. 11B is a waveform chart showing an uplink signal according to a mode according to some embodiments of the inventive concept.
Figure 12:
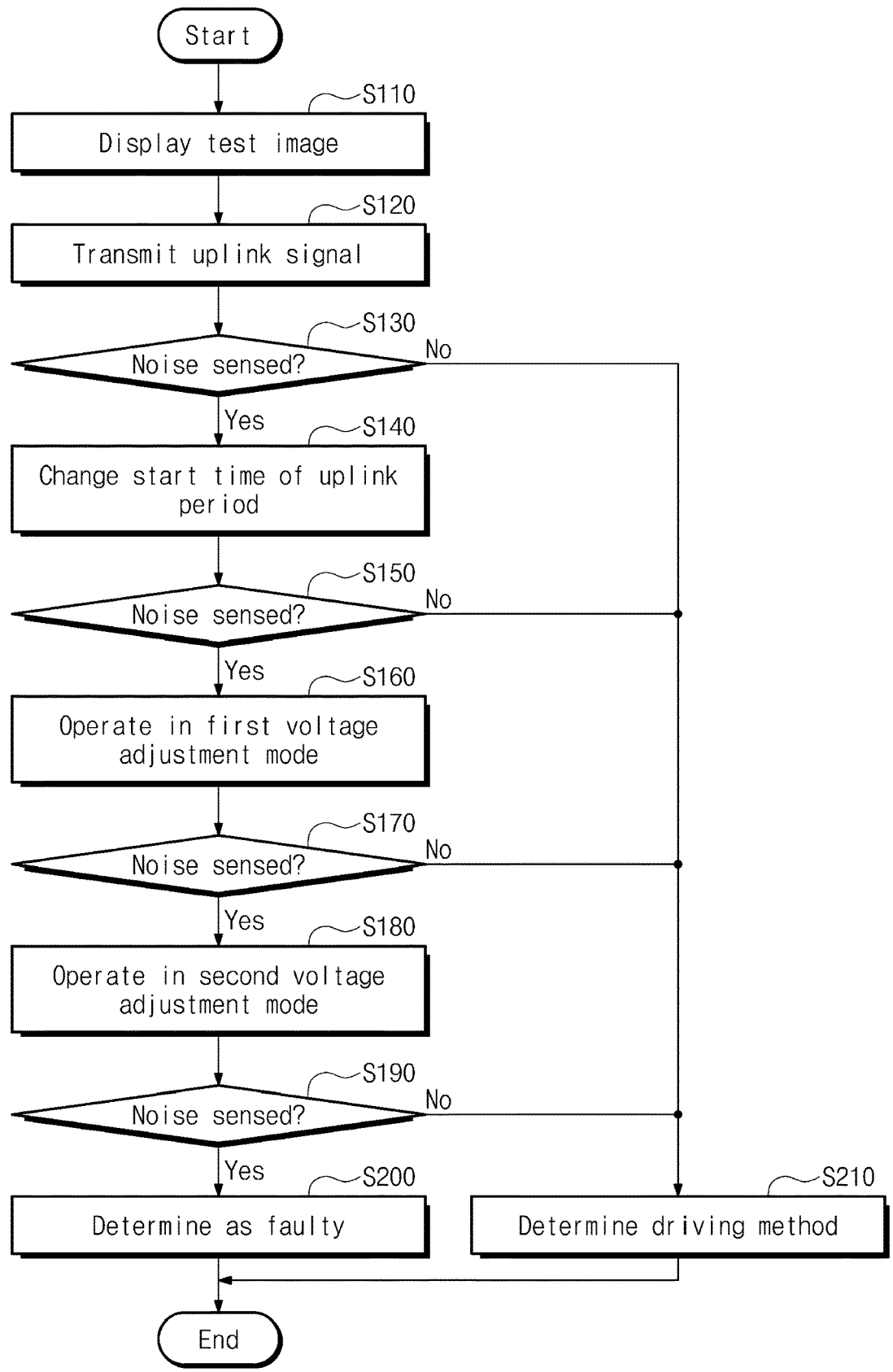
FIG. 12 is a flow chart for explaining a testing method of an electronic device according to some embodiments of the inventive concept.

FIG. 11A is an internal block diagram of the sensor control circuit according to some embodiments of the inventive concept, and FIG. 11B is a waveform chart showing an uplink signal according to a mode according to some embodiments of the inventive concept. FIG. 12 is a flow chart for explaining a testing method of an electronic device according to some embodiments of the inventive concept.

Referring to FIGS. 11A and 11B, a sensor controller 201C may include a sensor control circuit 201C1 and a signal generation circuit 201C2. The sensor controller 201C may further include the input detection circuit 200C3 and the switching circuit 200C4 shown in FIG. 7B.

The sensor control circuit 201C1 may receive the vertical synchronization signal Vsync from the main controller 1000C (see FIG. 3), and generate the sense synchronization signal Ssync on the basis of vertical synchronization signal Vsync. The sense synchronization signal Ssync may have a different frequency from the vertical synchronization signal Vsync or have a randomly variable frequency.

The sensor control circuit 201C1 may include a counter 201C11 and an output unit 201C12. The counter 201C11 may receive the vertical synchronization signal Vsync and the preset reference clock signal Rclk. When a first control signal TS1 is activated, the counter 201C11 starts a counting operation. The activated counter 201C11 counts the reference clock signal Rclk from the start time point of the vertical synchronization signal Vsync. For example, the counter 201C11 may count 1 whenever one period of the reference clock signal Rclk elapses from the start time point of the vertical synchronization signal Vsync.

The counted value Cv of the counter 201C11 may be provided to the output unit 201C12. The output unit 201C12 compares the counted value Cv with a preset reference value Cr. The reference value Cr provided to the output unit 201C12 may vary in the unit of at least one input sensing frame. When the counted value Cv is identical to the reference value Cr, the output unit 201C12 may output the sense synchronization signal Ssync activated in synchronization with a start time point of the next period of the reference clock signal Rclk. The output sense synchronization signal Ssync is provided to the signal generation circuit 201C2, and the signal generation circuit 201C2 output the uplink signal ULS at the activation time point of the sense synchronization signal Ssync.

The sensor control circuit 201C1 may further include a control signal generation circuit 201C13 for receiving a second control signal TS2. When the second control signal TS2 is activated, the control signal generation circuit 201C13 may output one of first and second voltage control signals V_CS1 and V_CS2. The activation period of the second control signal TS2 may overlap the activation period of the first control signal TS1. As another example, the second control signal TS2 may be activated in a different period from the first control signal TS1.

The signal generation circuit 201C2 may receive the sense synchronization signal Ssync, and output the uplink signal ULS at the start time point of the activation period of the sense synchronization signal Ssync. The uplink signal ULS is provided to the input sensor 200 (see FIG. 7B). When the first and second voltage control signals V_CS1 and V_CS2 are not activated, a voltage level of the uplink signal ULS may be set on the basis of a reference voltage Vr. Specifically, in a normal node NM in which the voltage control signals V_CS1 and V_CL2 are not activated, the uplink signal ULS may swing between a positive reference voltage +Vr and a negative reference voltage −Vr. Namely, the sensor controller 201C executes only a sequential or random shift operation of the uplink period ULP in a normal mode NM, and may not adjust the voltage level of the uplink signal ULS.

When the first voltage control signals V_CS1 is activated, the voltage level of the uplink signal ULS may be set on the basis of a first voltage V1. The first voltage V1 may have a different level from that of the reference voltage Vr. In a first voltage adjustment mode VDM1 in which the first voltage control signal V_CS1 is activated, the uplink signal ULS may swing between a positive first voltage +V1 and a negative first voltage −V1. The positive first voltage +V1 may have a lower level than the positive reference voltage +Vr and the negative first voltage −V1 may have a high level than the negative reference voltage −Vr. Meanwhile, when the second voltage control signal V_CS2 is activated, the voltage level of the uplink signal ULS may be set on the basis of a second voltage V2. The second voltage V2 may have a different level from that of the first voltage V1. In a second voltage adjustment mode VDM2 in which the second voltage control signal V_CS2 is activated, the uplink signal ULS may swing between a positive second voltage +V2 and a negative second voltage −V2. The positive second voltage +V2 may have a lower level than the positive first voltage +V1 and the negative second voltage −V2 may have a high level than the negative first voltage −V1.

Referring to FIGS. 11A, 11B, and 12, a testing process for the electronic device 1000 (see FIG. 1) according to some embodiments of the inventive concept is illustrated. When the testing process starts, a test image for testing may be displayed through the display panel 100 (see FIG. 3) (step S110). The test image may be displayed during a plurality of display frames. Then, the uplink signal ULS is transmitted to the input sensor 200 (see FIG. 3) located on the display panel 100 (step S120).

Whether a noise is generated in the test image by the uplink signal ULS is sensed (step S130). When the noise is not sensed, the sensor controller 201C is required to execute the sequential shift operation or the random shift operation, or operate in the first and second voltage adjustment modes VDM1 and VDM2. A driving method may be determined so that the sensor controller 201C operates in a basic mode in which the sequential shift operation or the random shift operation is not executed, namely, in a mode in which the start time point of the uplink period ULP (see FIG. 9A) is not changed (step S210).

On the other hand, when the noise is sensed, the sequential shift operation or the random shift operation starts to change the start time point of the uplink period ULP in the unit of at least one input sensing frame during the k input sensing frames IF1 to IFk (see FIG. 9A) (S140).

After the start of the sequential shift operation or the random shift operation, whether a noise is generated in the test image by the uplink signal ULS is sensed again (step S150). When the noise is not sensed, the sensor controller 201C only executes the sequential shift operation or the random shift operation, and is not required to operate in the first or second voltage adjustment modes VDM1 and VDM2. A driving method of the electronic device 1000 may be determined so that the sensor controller 201C operates in the normal mode NM for only executing the sequential or random shift operation (step S210). Here, the voltage level of the uplink signal ULS may be set on the basis of the reference voltage Vr. Specifically, in the normal node NM, the uplink signal ULS may swing between the positive reference voltage +Vr and the negative reference voltage −Vr.

However, when the noise is sensed, the sensor controller 201C may operate in the first voltage adjustment mode VDM1 for adjusting the voltage level of the uplink signal ULS on the basis of the first voltage V1 (step 160). The first voltage V1 may have a different level from that of the reference voltage Vr. In the first voltage adjustment mode VDM1, the uplink signal ULS may swing between the positive first voltage +V1 and the negative first voltage −V1.

After the first voltage adjustment mode VDM1, whether a noise is generated in the test image by the uplink signal ULS is sensed again (step S170). When the noise is not sensed, a driving method of the electronic device 1000 may be determined so that the sensor controller 201C operates in the first voltage adjustment mode VDM1 (step S210).

However, when the noise is sensed, the sensor controller 201C may operate in the second voltage adjustment mode VDM2 for adjusting the voltage level of the uplink signal ULS on the basis of the second voltage V2 (step 180). The second voltage V2 may have a different level from that of the first voltage V1. In the second voltage adjustment mode VDM2, the uplink signal ULS may swing between the positive second voltage +V2 and the negative second voltage −V2.

After the second voltage adjustment mode VDM2, whether a noise is generated in the test image by the uplink signal ULS is sensed again (step S190). When the noise is not sensed, a driving method of the electronic device 1000 may be determined so that the sensor controller 201C operates in the second voltage adjustment mode VDM2 (step S210). However, when the noise is sensed, the electronic device 1000 is determined to be faulty and the test operation may end.

FIGS. 11A to 12 illustrate that the voltage level of the uplink signal ULS is adjusted in two steps, but the voltage level of the uplink signal ULS may adjusted in two or more steps within a range of voltage levels that may be sensed by the input device 2000 (see FIG. 1).

As the voltage level of the uplink signal ULS becomes lower, a flicker phenomenon caused by an interference with a scan signal may be reduced or removed. Accordingly, by adjusting the uplink signal ULS according to whether the noise is sensed, a phenomenon in which the flicker is viewed in the electronic device 1000 may be prevented or reduced, and as a result, the display quality of the electronic device 1000 may be improved.

In the electronic device 1000 according to some embodiments of the inventive concept, as the start time point of the uplink period ULP in which the uplink signal ULS is input to the input sensor 200 is changed in the unit of at least one input sensing frame, the flicker is prevented from being steadily generated at a specific position in the electronic device 1000, and as a result, the display quality of the electronic device may be enhanced.

While this invention has been described with reference to aspects of some example embodiments thereof, it will be clear to those of ordinary skill in the art to which the invention pertains that various changes and modifications may be made to the described embodiments without departing from the spirit and technical area of the invention as defined in the appended claims and their equivalents. Thus, the scope of the inventive concept shall not be restricted or limited by the foregoing description, but be determined by the broadest permissible interpretation of the following claims, and their equivalents.

What is claimed is:

1. An electronic device comprising:
a display panel configured to display an image during a display frame;
an input sensor on the display panel; and
a sensor controller configured to operate in a first mode for sensing a first input by an input device that is external with respect to the electronic device or a second mode for sensing a second input, different from the first input, through the input sensor, wherein the sensor controller is further configured to transmit an uplink signal to the input device through the input sensor and to receive a downlink signal from the input device through the input sensor in the first mode,
wherein an input sensing frame in which the sensor controller is configured to operate in the first or second mode comprises an uplink period in which the uplink signal is provided to the input sensor, and
an interval between a start time point of the display frame and a start time point of the uplink period is variable in a unit of at least one input sensing frame during k input sensing frames, where k is an integer equal to or greater than 2.

2. The electronic device of claim 1, wherein the uplink period is shifted or delayed in a unit of one input sensing frame.

3. The electronic device of claim 2, wherein a start time point of a j-th input sensing frame among the k input sensing frames is shifted or delayed by (j−1) times of a first period of a preset reference clock from the start time point of a j-th display frame, where j is an integer equal to or smaller than k.

4. The electronic device of claim 2, wherein the interval is randomly variable in the unit of one input sensing frame during the k input sensing frames.

5. The electronic device of claim 1, wherein each of at least some among the k input sensing frames further comprises a downlink period in which a down link signal is transmitted through the input sensor from the input device.

6. The electronic device of claim 5, wherein the downlink period follows the uplink period.

7. The electronic device of claim 6, wherein the downlink period of a j-th input sensing frame among the k input sensing frames partially overlaps a (j+1)-th display frame corresponding to a (j+1)-th input sensing frame.

8. The electronic device of claim 5, wherein each of at least some among the k input sensing frames further comprises a response period between the uplink period and the downlink period.

9. The electronic device of claim 1, wherein the input sensor comprises transmission electrodes and reception electrodes insulated from and intersecting with the transmission electrodes.

10. The electronic device of claim 9, wherein the display panel comprises scan lines configured to sequentially receive a scan signal during the display frame, data lines configured to receive data signals, and a plurality of pixels connected to the scan lines and the data lines.

11. The electronic device of claim 10, wherein the sensor controller is configured to provide the uplink signal to at least the transmission electrodes, and the transmission electrodes extend along the scan lines.

12. The electronic device of claim 10, wherein the uplink period of the input sensing frame overlaps a scan period in which the scan signal is provided to some among the scan lines.

13. The electronic device of claim 9, wherein the input sensor is directly on the display panel.

14. The electronic device of claim 1, wherein the uplink signal comprises period information about the uplink signal.

15. The electronic device of claim 1, wherein the sensor controller comprises:
 a sensor control circuit configured to generate a sense synchronization signal based on a vertical synchronization signal for determining the start time point of the display frame; and
 a signal generation circuit configured to generate the uplink signal, and to change an output time point of the uplink signal according to the sense synchronization signal.

16. The electronic device of claim 15, wherein the sensor control circuit comprises:
 a counter configured to count a preset reference clock signal by one period from the start time point of the display frame corresponding to a j-th input sensing frame among the k input sensing frames; and
 an output unit configured to activate the sense synchronization signal, in response to a counted value being identical a preset reference value.

17. The electronic device of claim 15, wherein the sensor control circuit further comprises:
 a control signal generation circuit configured to generate a voltage control signal to control a voltage level of the uplink signal,
 wherein the signal generation circuit is configured to adjust the voltage level of the uplink signal in response to the voltage control signal.

18. A testing method for an electronic device comprising:
 displaying a test image for testing through a display panel during a plurality of display frames;
 transmitting an uplink signal to an input sensor on the display panel during an uplink period;
 sensing a noise is generated in the test image; and
 in response to noise being sensed, changing an interval between a start time point of the uplink period and a start time point of each display frame during k input sensing frames in a unit of at least one input sensing frame, where k is an integer equal to or greater than 2.

19. The testing method of claim 18, further comprising, after the changing the interval:
 sensing noise is generated in the test image; and
 adjusting a voltage level of the uplink signal based on a first voltage, in response to noise being sensed.

20. The testing method of claim 19, further comprising, after the adjusting of the voltage level:
 sensing noise is generated in the test image; and
 adjusting the voltage level of the uplink signal based on a second voltage, in response to noise being sensed.

* * * * *